United States Patent [19]

Cross

[11] 3,872,437

[45] Mar. 18, 1975

[54] SUPERVISORY CONTROL SYSTEM

[75] Inventor: Charles Cross, Glenside, Pa.

[73] Assignee: Robertshaw Controls Company, Richmond, Va.

[22] Filed: Jan. 18, 1974

[21] Appl. No.: 434,708

Related U.S. Application Data

[63] Continuation-in-part of Ser. No. 314,304, Dec. 12, 1972, abandoned, and Ser. No. 314,306, Dec. 12, 1972, and Ser. No. 314,307, Dec. 12, 1972.

[52] U.S. Cl. ... 340/147 SY, 178/69.5 R, 179/15 BS

[51] Int. Cl. .......................... H04b 1/16, H04q 1/00

[58] Field of Search ... 340/147 R, 147 SY, 146.1 C, 340/146.1 D, 163; 328/30, 94; 178/69.5

[56] References Cited

UNITED STATES PATENTS

| | | | |
|---|---|---|---|
| 3,349,374 | 10/1967 | Gabrielson et al. | 340/163 |
| 3,361,978 | 1/1968 | Fiorini | 328/94 |
| 3,384,874 | 5/1968 | Morley et al. | 340/163 |
| 3,576,947 | 5/1971 | Kruger | 340/146.1 D |
| 3,582,786 | 6/1971 | Bruglemans | 340/146.1 BA |
| 3,600,700 | 8/1971 | Matsuo | 340/170 X |
| 3,680,050 | 7/1972 | Griffin | 340/167 R |
| 3,747,067 | 7/1973 | Fox et al. | 340/147 SY |
| 3,789,303 | 1/1974 | Hoffman et al. | 178/69.5 R |

*Primary Examiner*—Donald J. Yusko
*Attorney, Agent, or Firm*—Anthony A. O'Brien

[57] ABSTRACT

A supervisory control system for operating remote field points includes a central control station connected with a plurality of remote stations by a shielded, twisted pair cable, the central control station and each of the remote stations having a transmitter sequencer for transmitting messages in a biphase code with each bit having a bit time with a transition near the center thereof and the central control station and each of the remote stations having a receiver sequencer for generating a window pulse in response to each bit transition after a predetermined time less than one bit time, each window pulse having a width to span the center of the next bit time and being supplied to enable a gate receiving bit signals corresponding to bits of the transmitted messages such that only bit signals coinciding with the window pulses are passed by the gate to decode the message.

23 Claims, 13 Drawing Figures

SUPERVISORY CONTROL SYSTEM

REFERENCE TO RELATED APPLICATIONS

The present application is a continuation-in-part of copending patent applications Ser. No. 314,304, now abandoned, Ser. No. 314,306 and Ser. No. 314,307, each of which was filed Dec. 12, 1972, and each of which is incorporated herein by reference.

BACKGROUND OF THE INVENTION

1. Field of the Invention

The present invention pertains to supervisory control systems for monitoring and controlling operating systems of large installations or processes from a central control station.

2. DESCRIPTION OF THE PRIOR ART

With the increase in complexity of industrial and commerical processes and the increase in size of buildings and building installations, there has been a need to provide centralized control in order to reduce the manpower required to supervise the many sub-systems, control and monitoring points within the processes or installations as well as to provide efficient control of the processes or buildings of the installation. The system or process to be monitored and/or controlled may have a great variety of functional activities, such as heating, cooling, lighting and water, air and electrical power distributon which effect the environment at a great number of remote field points, at least some of which may be located at substantial distances from a central control station.

In order to allow an operator at the central control station to have complete control of the system, it has been the accepted practice to provide him with a reference manual which includes the addresses of all of the field points within the system and the functional nature of each field point, and the operator has had to refer to this manual in order to select the correct field point to effect a desired control or monitoring function. Once the remote field point is selected, it must be addressed by the operator working a manual subsystem, such as a keyboard. If a status check is to be run, the operator must locate and individually address all such status points; and, if a malfunction or suspicious condition is located, the operator must determine if other related conditions exist and effect the necessary steps for controlling or bypassing the condition. Such centralized supervisory systems are, thus, limited by the abilities of the operator and, in particular, by his familiarity with the reference manual. Accordingly, multi-wire scanning systems and computers have been utilized with such supervisory control systems in order to reduce dependence on the operators.

Conventional supervisory control systems capable of providing the previously discussed functions normally have had the disadvantage of requiring a great number of channels of communication, e.g. wires, between the remote and central stations thereby limiting both total field point capacity and future expansion of the system. While multiplexing has alleviated this disadvantage somewhat, it has the inherent problem of slow system response.

Known supervisory control systems for monitoring and controlling the enviromental systems of large buildings and building complexes have further had the disadvantage of not being able to quickly and automatically respond to alarm or out-of-tolerance conditions in that, when an alarm is given in these systems, it is necessary to interrogate the system to determine which field point is in the alarm status or just what the out-of-tolerance condition may be.

The prior art supervisory systems have had other undesirable features and disadvantages among which are: requiring substantially different amounts of time to obtain a return from an analog point than from a status point; requiring the use of multiwire systems; and relaying strictly on redundancy for checking the field points.

SUMMARY OF THE INVENTION

The present invention is generally summarized in a supervisory control system for operating a plurality of field points including a central control station including a transmitter for transmitting messages each formed of bits corresponding to an address of one of the field points, the messages being transmitted in a biphase code with each bit having a bit time with a transition near the center thereof, and the transmitter includes scanning means for forming messages to automatically sequentially address the field points, a plurality of remote stations each including a receiver for receiving the messages, a plurality of the field points and a decoder connected with the receiver for addressing the field points, the receiver including means for generating bit signals in accordance with bit transitions of the messages, a window generator responsive to each bit signal to generate a window pulse after a predetermined time less than one bit time, each window pulse having a width to span the center of the next bit time, and gating means receiving the window pulses and the bit signals and passing the bit signals to the decoder only when the bit signals coincide with the window pulses, and transmission means for coupling the central control station with the remote stations.

Accordingly, it is a basic object of the present invention to provide a supervisory control system overcoming the above-mentioned disadvantages of the prior art by transmitting messages in a biphase code and self-timing the decoding of the messages by generating a window pulse in response to each bit of a message having a width to span the center of the next bit time.

Another object of the present invention is to provide a supervisory control system having a central station capablel of communicating with a plurality of remote stations by several means including cable, such as shielded, twisted pair cable; radio; link; and telephone modem.

A further object of the present invention is to construct a supervisory control system for providing rapid discovery of off-normal conditions at any one of a plurality of field points, indication and logging of contact status and analog values at the field points and manual or automatic control of equipment at the field points.

Another object of the present invention is to provide a supervisory control system in which a central station is capable of communicating with a large number of remotely located field points over a small number of signal transmission channels.

A further object of the present invention is to contruct a monitoring and control system having continuous alarm scanning for off-normal conditions at a plurality of remote field points such that the off-normal conditions are identified within a short period of time after their initial occurrence.

A still further object of the present invention is to provide a monitoring and control system in which the bits of messages transmitted between central and remote stations generate a succession of windows at the receiver. The windows are spaced such that each successive bit must fall within a window and, thus, provide self-timing of the message. The message preferably includes a synchronization code preceding a double-word body wherein the words are identical and are compared with each other at the receiver thereby providing verification of the message.

It is also an object of the present invention to construct a supervisory control system having a central control station communicating with a plurality of remote stations having analog, status and start/stop field points with each field point having one or more functions and a separate address. The central control station continuously cycles through the filed point addresses so that an alarm will be received or an instruction for starting or stopping a control function transmitted within one scan cycle, some alarms being initially inhibited to allow start/stop conditions to stabilize before indicating an alarm status.

Another object of the present invention is to construct a supervisory control system in which a plurality of remote stations can each be provided with up to 64 field points of which a maximum of 32 points can be analog and multiplexed to the input of an analog-to-digital converter while all 64 points can be status or control points.

An additional object of the present invention is to utilize a biphase code, such as the Manchester code, in a supervisory control system to achieve high speed transmission and reception of data via an AC coupled transmission line with minimum interference from electromagnetic and electrostatic noise.

A more specific object of the present invention is to effect self-timing of messages transmitted between a central control station and remote stations of a supervisory control system by utilizing a clock source for supplying clock pulses to a window counter and generating a window pulse between predetermined counts of the window counter, the window counter being reset after each timely received bit of a message such that an inexpensive clock source can be utilized without accumulating error therefrom.

An additional object of the present invention is to utilize a receiver sequencer at the central control station and the remote stations of a supervisory control system to receive a first predetermined bit signal regardless of timing and thereafter to receive bit signals only in coincidence with window pulses generated in response to the previously received bit signal.

The present invention has another object in that a shielded, twisted pair cable is utilized to connect central and remote stations of a supervisory control system in order to provide differential signal transmission and resulting common mode noise rejection A further object of the present invention is to maximize noise immunity in a supervisory control system by utilizing biphase coded messages communicated between stations on a shielded, twisted pair cable and by timing bits of the received messages by self-generated window pulses.

Some of the advantages of the present invention over the prior art are that a single cable can be used to provide communication between central and remote stations while facilitating changes and additions to the supervisory control system, noise interference with communications is minimized and the circuitry required at the central and remote stations is simple and relatively inexpensive.

Other objects and advantages of the present invention will become apparent from the following description of the preferred embodiment taken in conjunction with the accompanying drawings.

DESCRIPTION OF THE PREFERRED EMBODIMENTS

Figure 1:
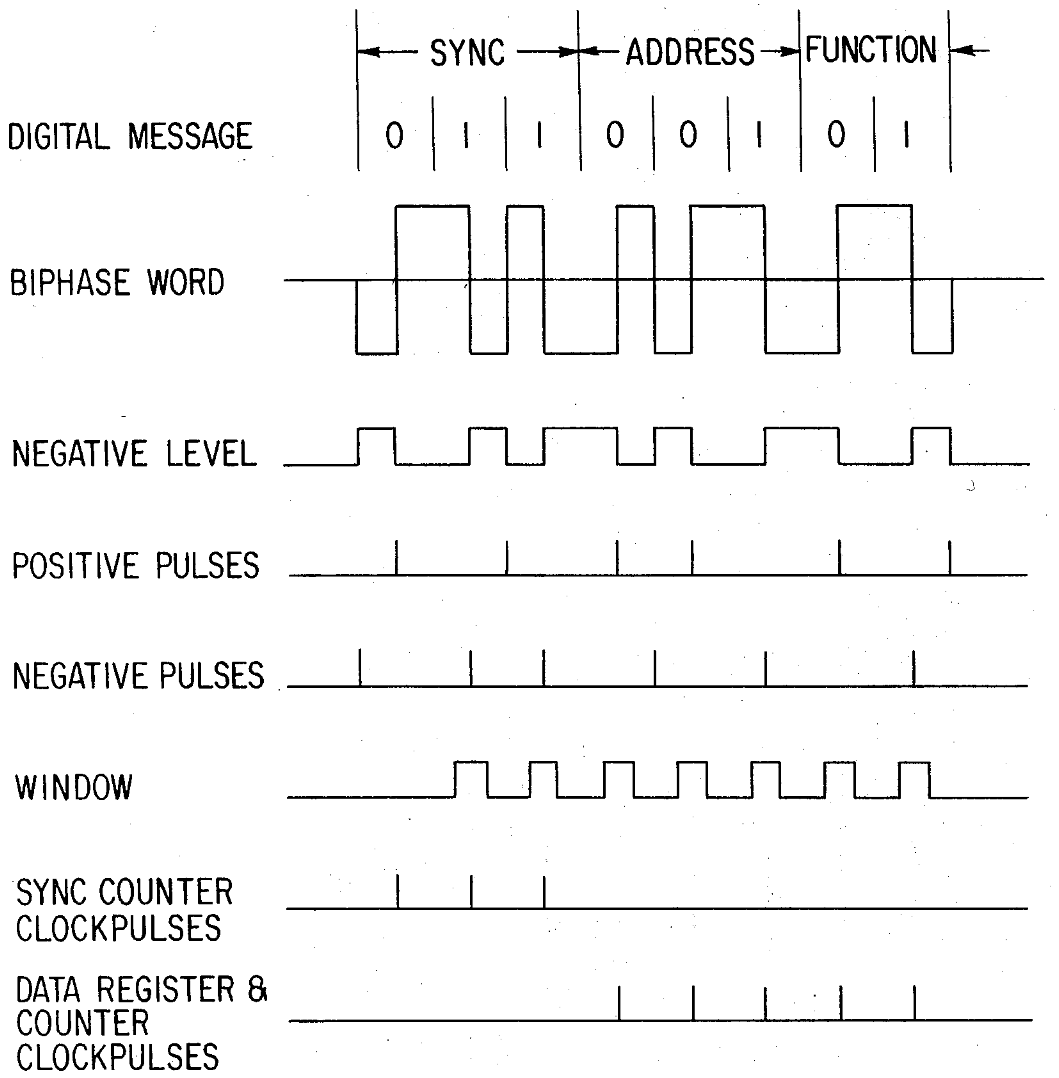
FIG. 1 is a timing diagram showing the biphase Manchester coded signals used in the supervisory control system of the present invention and the signal components of the code.

A simplified and abbreviated 8-bit digital message for use in the supervisory control system of the present invention is illustrated in FIG. 1 with the first three bits forming a synchronizing code, the next three bits defining an address and the last two bits defining an instruction. In practice, the length of the digital message transmitted is determined by the specifications of the system such that the digital messages include an adequate number of bits for a synchronizing code, an address and instructions; and, thus, the discussion of the supervisory control system of the present invention as utilizing an 8-bit digital message is for exemplary purposes only. The digital message is transmitted in a biphase code, such as the Manchester code, wherein each of the bits has a bit time or period with a transition near the center thereof. To this end, the biphase transmitted word, as shown in FIG. 1, corresponds to the digital message with a positive-going transition in the middle of a bit time representing a "0" and a negative-going transition in the middle of a bit time representing a "1."The negative level signal shown in FIG. 1 represents the digital message and the biphase word as a return-to-zero code in inverted form.

The receiver sequencer circuitry to be discussed hereinafter produces bit signals in the form of positive pulses and negative pulses from positive-going and negative-going transitions of the biphase code, respectively; and, as will be described in more detail hereinafter, the first bit (0) of the synchronizing code causes a window pulse to be generated after a time period of less than one bit time having a width to span the center of the next bit time when the next bit transition should arrive. If the next bit transition (1) of the synchronizing code is received within the time span of the first window pulse, a second window pulse will be generated in a manner similar to the generation of the first window pulse and so on for the remainder of the digital message.

Figure 2:
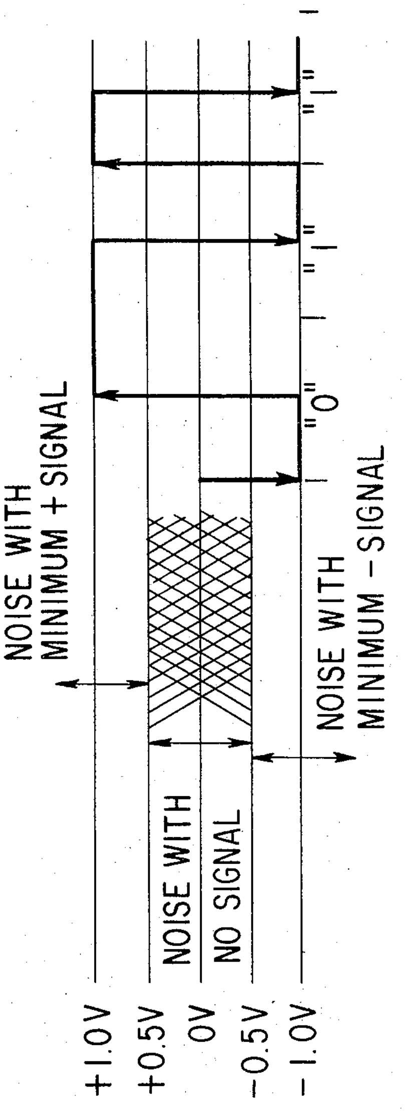
FIG. 2 is a waveform diagram showing the relationship of the biphase signals to noise.

As illustrated in FIG. 2, the biphase word is transmitted with an amplitude sufficient to exceed the expected noise level in both positive and negative directions, shown in FIG. 2 as +0.5 to −0.5 volts. A level comparator is utilized to discriminate against signals below the expected noise levels, and only transitions exceeding the expected noise levels will be treated as signals of the transmitted message.

Figure 3:
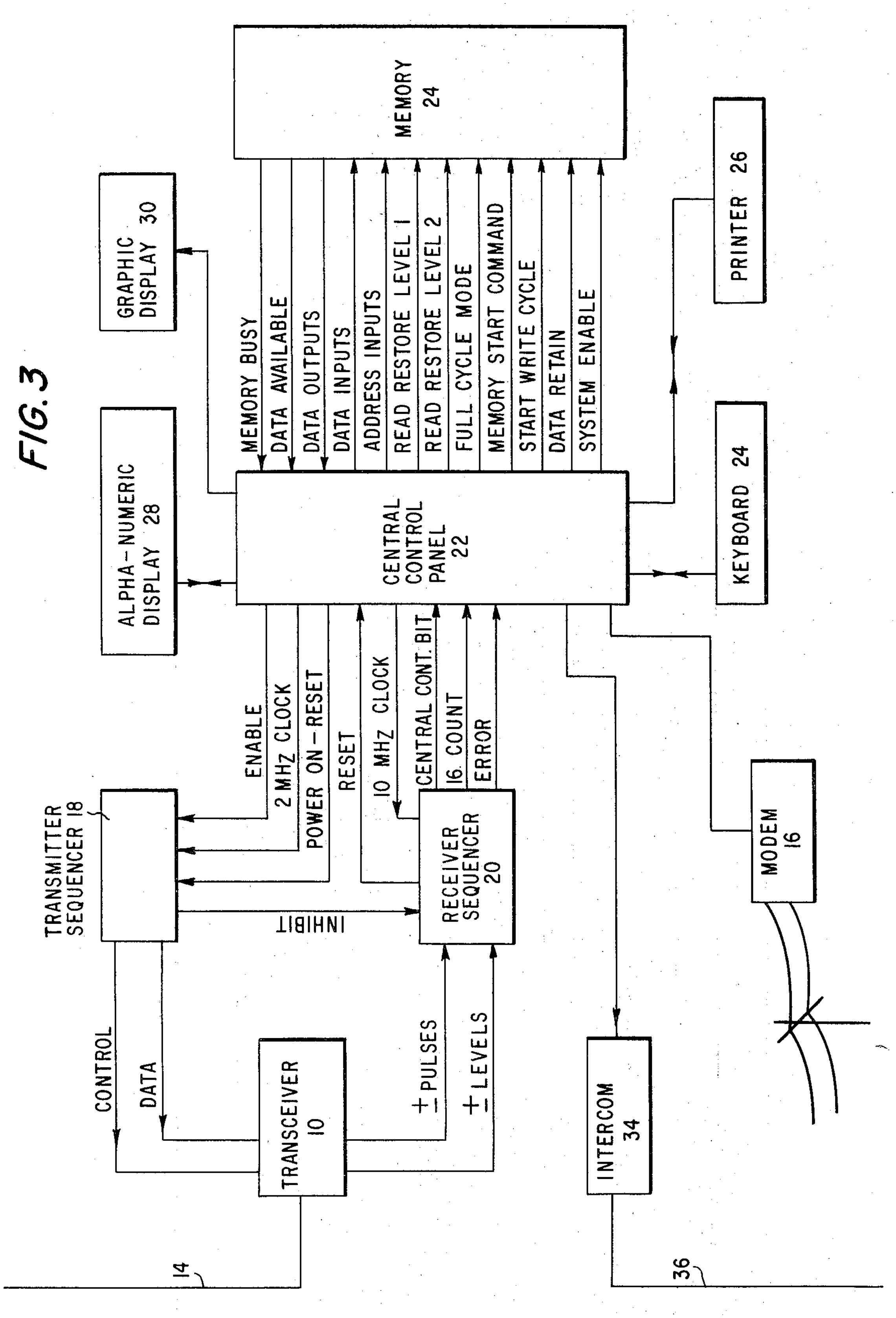
FIG. 3 is a simplified block diagram of a central control station for the supervisory control system of the present invention.
Figure 4:
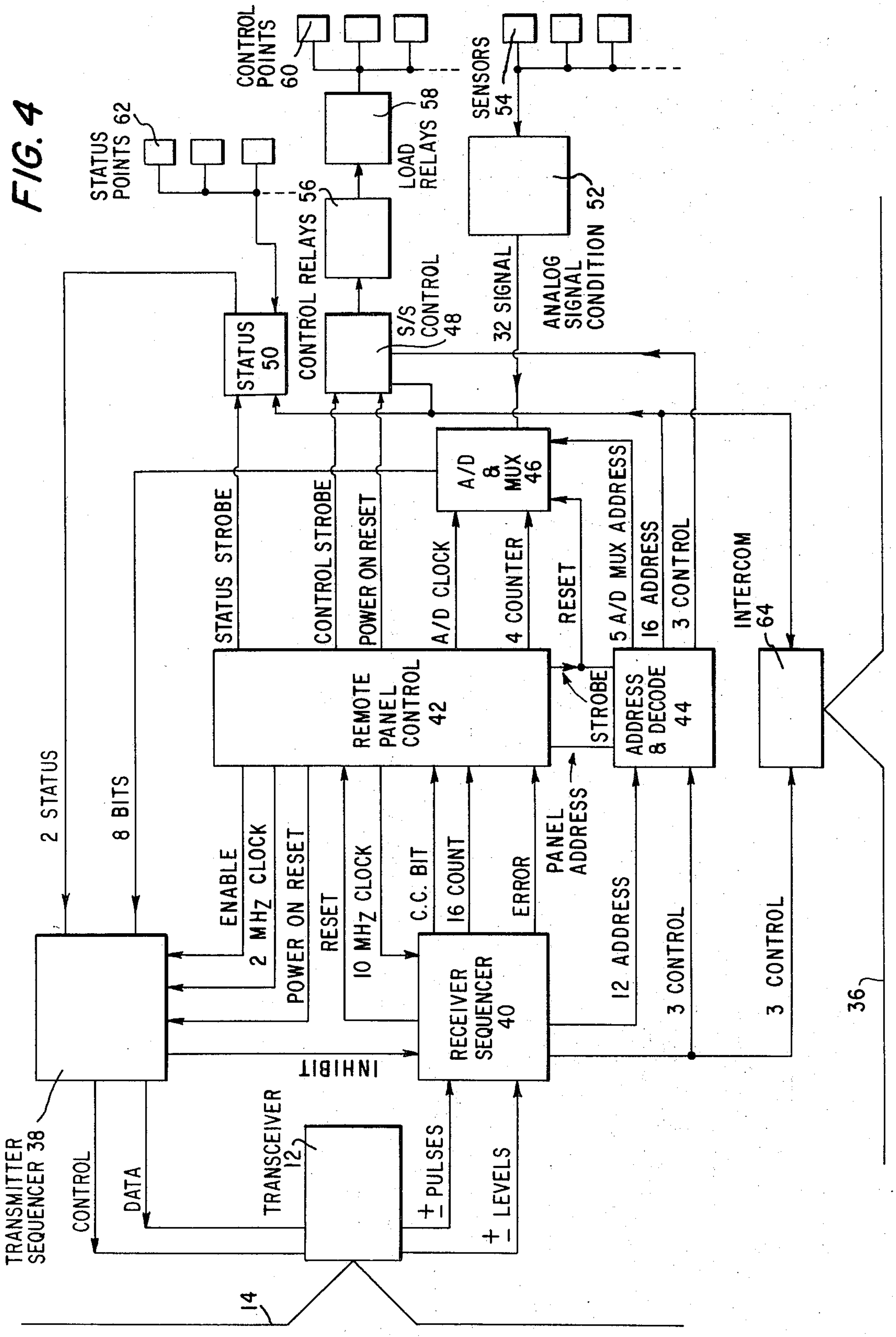
FIG. 4 is a simplified block diagram of a remote station for the supervisory control system of the present invention.

The supervisory control system according to the present invention includes a central control station, as illustrated in FIG. 3, connected with a plurality of remote stations, as illustrated in FIG. 4, by a transmission line 14 formed of a shielded, twisted pair of wires to provide differential transmission and common mode rejection of noise. The central control station has a transceiver 10 connected with the transmission line 14 and each of the remote stations has a similar transceiver 12 connected with the transmission line 14. Communication between the central and remote stations could be provided by any suitable means such as wireless transmission or leased telephone lines via modem as illustrated at 16 in FIG. 3; however, the use of a shielded, twisted pair cable is particularly advantageous due to the differential transmission characteristics thereof.

The transceiver 10 at the central control station receives messages from a transmitter sequencer 18 over data and control outputs therefrom to transmit such messages to the remote stations via transmission line 14, and messages received from the remote stations via transmission line 14 are supplied from the transceiver 10 as bit signals in the form of positive and negative pulses and positive and negative levels to a receiver sequencer 20. The transmitter sequencer 18 has an inhibit output for inhibiting the receiver sequencer 20 when a message is being transmitted. A central control panel 22 has enable, 2 MHz clock and power on-reset outputs supplied to transmitter sequencer 18 and supplies a 10 MHz clock output to receiver sequencer 20. The receiver sequencer 20 supplies reset, central control station bit, 16-count and error outputs to the central control panel 22. The central control panel 22 is connected with a memory 24, and some of the types of functions between the memory and the central control panel are indicated in FIG. 3 but are not discussed in detail since they are conventional and well known and are included only for illustrative purposes. The memory 24 is arranged to identify the field points by unit and unit number. Also connected to the central control panel, either as standard or optional equipment, are a keyboard 26, a printer 28, an alphanumeric display 30, a graphic display 32 and an intercom 34, the latter being connected to the remote stations via cable 36 or like means.

Each remote station, as illustrated in FIG. 4, has a transmitter sequencer 38 for supplying digital messages to transceiver 12 over data and control outputs for transmission to the central control station via transmission line 14 and a receiver sequencer 40 receiving bit signals in the form of positive and negative pulses and positive and negative level outputs from transceiver 12 corresponding to messages transmitted from the central control station via transmission line 14, and the transmitter sequencer 38 has an inhibit output for inhibiting the receiver sequencer 40 when a message is being transmitted by the remote station. The receiver sequencer 40 supplies remote station (C. C.) bit, 16-count, error and reset outputs to a remote panel control 42 which supplies a 10MHz clock to the receiver sequencer 40 and supplies enable, 2MHz and power on-reset outputs to transmitter sequencer 38. The remote panel 42 is connected with an address and decode unit 44 which receives address and control outputs from receiver sequencer 40 and supplies address and control outputs to a start/stop control 48 and a status unit 50. An analog-to-digital convertor and multiplexer unit 46 receives address inputs from address and decode unit 44 as well as reset, 4-counter and A/D clock inputs from the remote panel control 42 and signal inputs from an analog signal condition unit 52 connected with a plurality of analog field points 54 in the form of sensors. The size and number of each of the units 46, 48 and 50 is determined by the number and type of field points connected to the remote panel. The units 46 and 50 have outputs supplied to the transmitter sequencer 38 in order to permit the formation of an answer message to be transmitted to the central control station in accordance with the conditions at analog field points 54 and status field points 62 which are connected with status unit 50. The start/stop control unit 48 operates a plurality of control relays 56 which control load relays 58 operating control field points 60 which may, for example, be motors or other devices capable of being turned on and off. An intercom 64 is connected to the intercom 34 at the central control station via cable 36 and to receive the control output from the receiver sequencer 40 and the address output of the address and decode unit 44.

Figure 5:
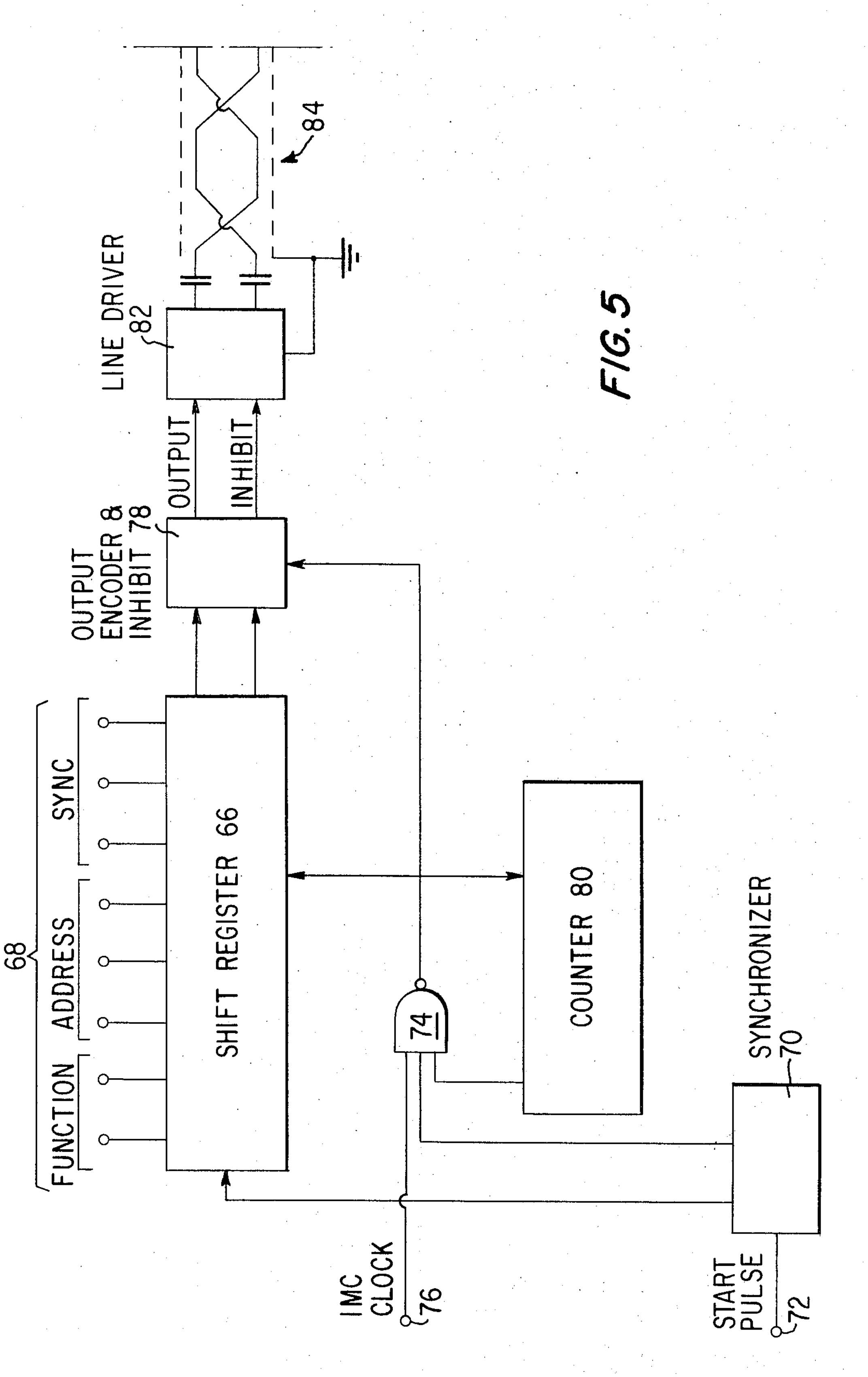
FIG. 5 is a simplified block diagram of a transmitter sequencer and line driver utilized in the central and remote stations of the supervisory control system of the present invention.
Figure 8:
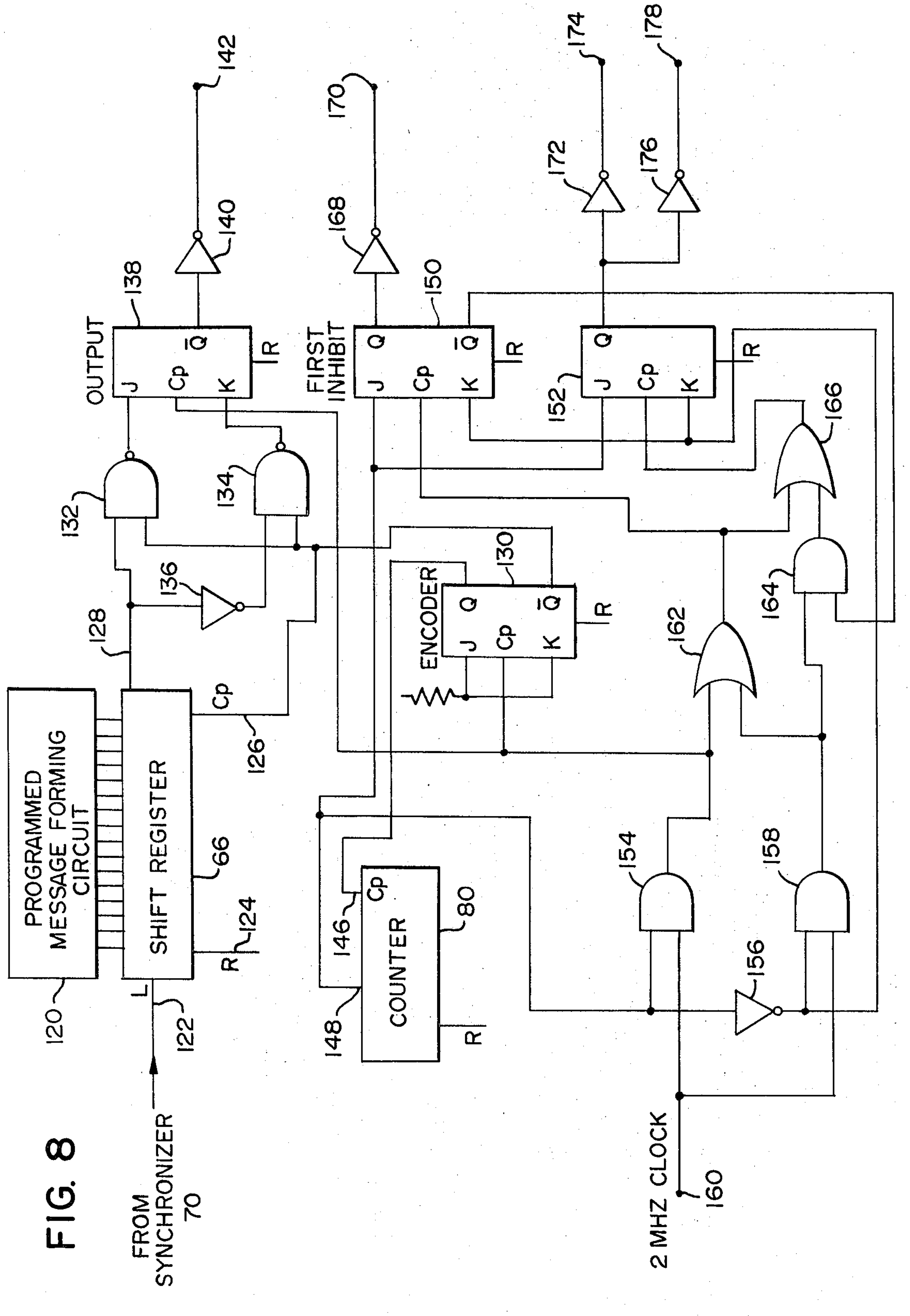
FIG. 8 is a schematic diagram of the transmitter sequencer of FIg. 5.

A transmitter sequencer for use at the central control station and the remote stations is illustrated in simplified form in FIG. 5 and includes a shift register 66 having a plurality of parallel inputs 68 supplied by sequencing control, such as a programmed message forming circuit (see FIG. 8). For exemplary purposes, only eight inputs have been shown in labeled to correspond with the digital message illustrated in FIG. 1. A synchronizer 70 receives a start (or enable) pulse supplied to a terminal 72 to supply an input strobe signal to the shift register 66 and to a NAND gate 74 having a 2MHz clock pulse supplied thereto from a source (not shown). When NAND gate 74 is enabled by synchronizer 70, the 2MHz clock pulses are fed to an output encoder and inhibit circuit 78 which includes divider circuitry to supply 1MHz clock pulses to the shift register 66 and a counter 80, the counter 80 being arranged to inhibit NAND gate 74 after a count of 8 is reached corresponding to unloading of the shift register. The clock pulses fed to the shift register 66 shift the input data from the shift register to the output encoder and inhibit circuit 78 which generates a biphase code, as shown in FIG. 1, representing the data input states and forwards either the biphase code or an inhibit signal to a normally inhibited, differential line driver 82. The transmitter is not connected to the transmission line 14 unless a message is being transmitted preventing undue loading of the line. The line driver 82 is preferably capable of supplying thirty volts to the transmission line.

Figure 6:
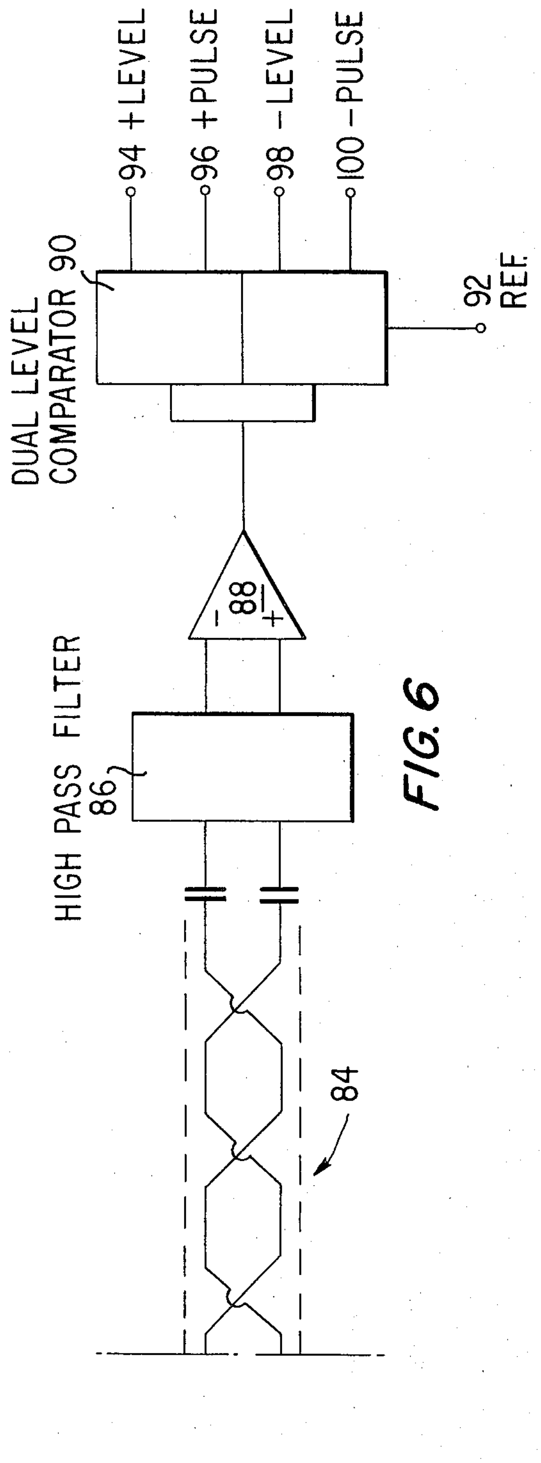
FIG. 6 is a simplified block diagram of a line reciver utilized in the central and remote stations of the supervisory control system of the present invention.

As illustrated in FIG. 6, the transceiver 10 and 12 each include a high pass filter 86 capacitively coupled to the shielded, twisted pair 14 to supply filtered signals to a differential amplifier 88 having its output supplied to a dual level comparator 90. The comparator 90 compares the output of the differential amplifier with a reference voltage supplied at terminal 92 from any suitable source (not shown) to generate bit signals in the form of a positive level 94, a positive pulse 96, a negative level and a negative pulse 100.

Figure 7:
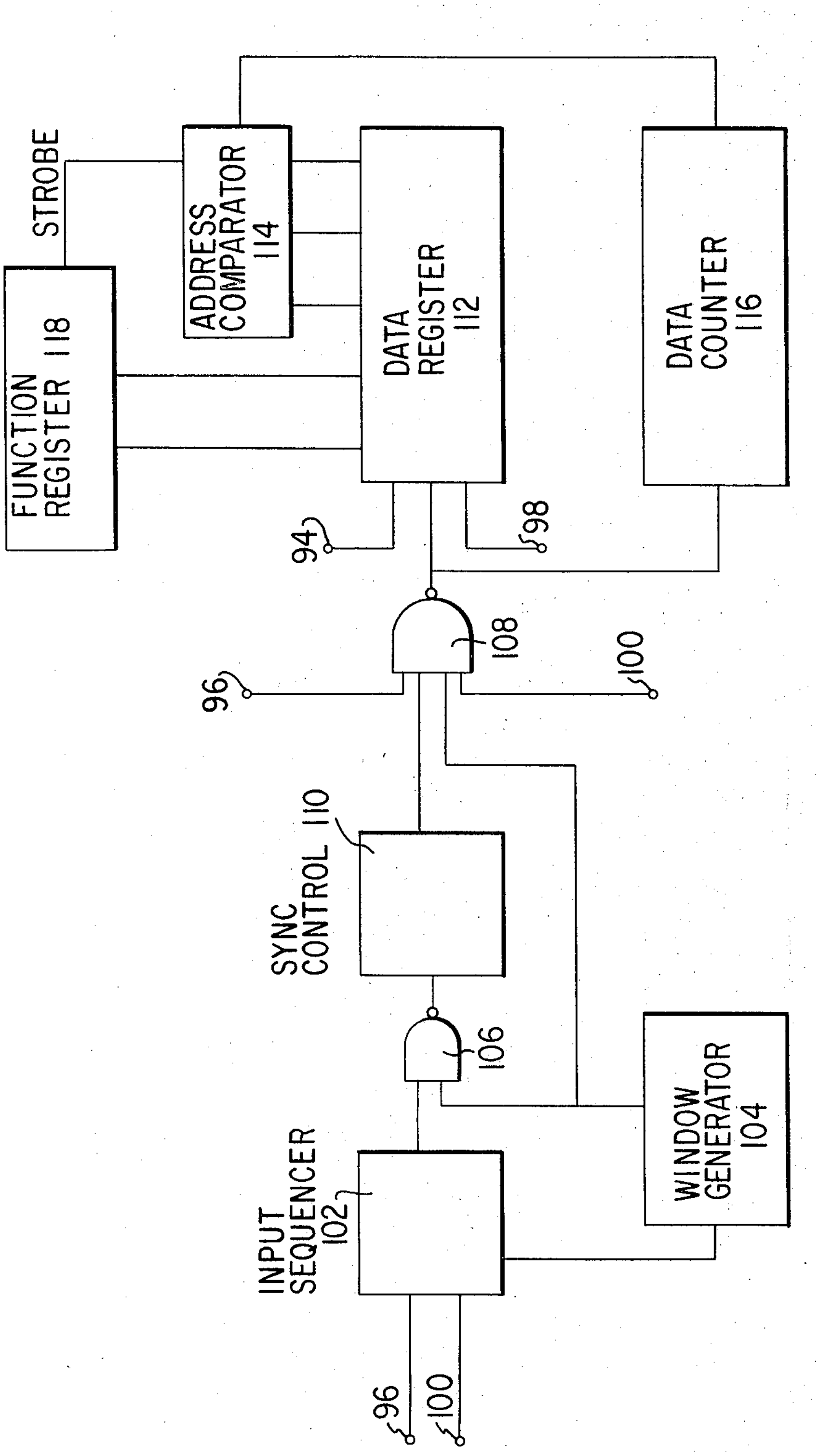
FIG. 7 is a simplified block diagram of a receiver sequencer utilized in the central and remote stations of the supervisory control system of the present invention.

The receiver sequencers 20 and 40 are shown in simplified form in FIG. 7 and each includes an input sequencer 102 receiving the positive and negative pulses from outputs 96 and 100 of comparator 90. The input sequencer 102 supplies an output to a window generator 104 and an output to a NAND gate 106. The window generator 104 is responsive to the output from input sequencer 102 to generate a window pulse after a time period of less than one bit time, the window pulse being supplied to NAND gate 106 and to a NAND gate 108. A synchronizer control 110 receives the output of the input sequencer 102 through NAND gate 106 and supplies an enabling input to NAND gate 108 once it has been determined that a correct synchronizing code has been received. The NAND gate 108 receives positive and negative pulses on outputs 96 and 100 from comparator 90, respectively, and, once enabled by synchronizer control 110, operates to supply bits of the transmitted message to a data register 112 when they coincide with the window pules generated by window generator 104 such that the bits of the transmitted message are self-clocked into the data register 112. The data in register 112 is supplied to an address comparator 114 which receives a strobe output supplied from a data counter 116 after the first word of the message has been received to permit each remote station to compare the received address with the addresses of the points thereat to determine whether the remote station contains the addressed point as indicated by a panel address signal supplied to the remote control panel, as shown in FIG. 4. The data counter receives the output from NAND gate 108. The function portion of the digital message is supplied to a function register 118.

The selection of code format and method of identifying information is very important in data transmission since much of the speed, efficiency and reliability of a data transmission system depends on the code. Accordingly, the use of a biphase code, particularly the Manchester code, is preferred in the supervisory control system of the present invention. While the digital message has been described above as an 8-bit message for exemplary purposes, the preferred digital message is formed of 35 bits defining a threebit synchronizing code and a double 16-bit word (a single word repeated once). Thus, if the digital transmission rate is one million bits per second, the time required for such a message to be sent by the central control station until completion of the returned answer message from a remote station is less than 100 microseconds; and, accordingly, up to 10,000 field points can be checked in less than 1 second. The combination of the use of a biphase code, wherein each bit has a transition in the center of a bit time, with a shielded, twisted pair cable for differential transmission and self-timing by generating a window pulse in response to a preceding bit minimizes error in data transmission and permits the scanning of field points from the central control station in a short time well within alarm identification requirements without sacrificing accuracy.

The operation of the supervisory control system of the present invention will be described in general with reference to FIGS. 1–7; however, it is noted that the circuitry and function of the transmitter sequencer, the line driver, the line receiver and the receiver sequencer are described in more detail hereinafter with reference to FIGS. 8–12 and that the circuitry and function of the remote stations including the decoder and the analog to digital converter are described in greater detail in copending U.S. patent applications Ser. No. 314,305, 314,308 and 314,309 to Charles filed Dec. 12, 1972, which patent applications are incorporated herein by reference.

The address 1 is reserved for the central control station so that if the first word of a message begins with a 1 the message is a return or answer from a remote station to the central control station and the remote stations will ignore the message. All words sent from the central control station will begin with a 0 followed by the remainder of the remote panel address.

The central control station is arranged to scan or sequentially contact each field point at each remote station by transmitting a 35-bit message (a single 16-bit word repeated once and preceded by a 3-bit synchronizing code) to the remote stations. The double words supplied to the shift register 66 are sequenced to advance counts representing the addresses of all of the field points in the system. The address of each message from the central control panel 22 begins with 0 and the complete message is fed to transmitter sequencer 18, transceiver 10 and over transmission line 14 to the transceivers 12 at the remote stations where the message is supplied to receiver sequencers 40. The first bit of the first word of the message received at the remote stations is sent to the remote panel controls 42 and the remainng 15 bits of the word are fed to address and decode units 44 (as a 12-bit address and 3-bit control, the 3-control bits also being fed to intercom 64). At a count of 16 the remote panel control starts sequencer (not shown in the remote panel control 42 which in turn produces an analog-to-digital clock which is sent to multiplexer 46 to start conversion. The receiver sequencers 40 compare the first 16-bit word received to the second 16-bit word as it is received and, if they are not identical, sends an error signal to the remote panel control 42 so that message received will be ignored. If the remote panel is not addressed by the incoming message as determined by the address and decode units 44, then no action takes place at that remote station. Similarly, if the message is preceded by a 1 indicating that the message is intended for the central control station, the remote stations will ignore the message.

The 15 bits of the first word will be decoded at the address and decode unit 44 and, according to the address contents of the word, will enable the remote control panel and the addressed point at analog-to-digital multiplexer unit 46, start/stop control 48 or status unit 50. However, no further action will take place at the addressed field point unless the remote station has been addressed and the received message verified. The control bits will also be decoded to produce the inputs to the start-stop control unit for turning on or off the point addressed, usually by actuating a register or flip flop associated with that point. When the second word is received and compared, the instruction will be carried out to obtain a readout from status points 62 or to effect the desired control at points 60, assuming that the proper panel address has been received. When there is a readout from status points 62, this readout is fed through the status unit 50 to the transmitter sequencer 38 for transmission to the central control station.

When an analog point is addressed, after receiving the first 16-bit word, the output from the addressed sensor point 54 is sent to analog-to-digital converter 46 and conversion made of the analog input. After the second word has been received, the binary output from the analog-to-digital converter 46 is fed to transmitter sequencer 38 where it forms part of the message from the remote station. In this manner, the message time for analog field points is reduced such that message times for operating analog, status and control points in the supervisory control system of the present invention remain the same. When there is an error in the incoming message, however, transmitter sequencer 38 is not enabled, and no message will be sent from the transmitter sequencer 38.

Assuming a correct message has been received, when the answer message is transmitted, the receiver sequencer 40 is inhibited by the transmitter sequencer 38, and the answer message is supplied to the remote station transceiver 12 and to the central transceiver 10 via transmission line 14. At the central station the answer message is supplied to the receiver sequencer 20 where the two 16-bit words are compared; and, if correct, the central control panel 22 produces the desired readout or proceeds to the next point or compares the return with a previous output obtained from the memory 24, which comparison can be displayed, printed out or stored as desired.

If no answer message is received at the central control station within a predetermined expected time period, the original message is repeated. If still no answer message is received from the remote station within a second time period, an alarm is provided noting there has been no response from the addressed point.

In the case of power failure at any remote station, when power is restored all of the circuitry at the remote station will be reset to insure that no start/stop control point will be in any position but off.

In the operation of the transmitter sequencers, as illustrated in FIG. 5, a message to be transmitted is loaded into a shift register 66 corresponding to addresses from a sequencer, from the memory or from the keyboard if a field point is being manually addressed; or if the transmitter sequencer is at a remote station, the inputs of the shift register will be from the analog or status field points. The message is sequentially shifted through register 66 to the output encoder 78 where the bits of the message are converted to biphase code and supplied to the transmission line 14 as positive and negative going transitions. The output from the transmitter sequencer is inhibited by counter 80 and inhibit 78 after the message is sent. The counter 80 is arranged to cut off the transmission after the proper number of bits have been transmitted.

The receiver sequencer and line receiver, as illustrated in FIG. 6 and 7, includes a high impedance, high pass filter 86 arranged to provide high attenuation at low frequencies and a differential input circuit including the high speed differential operational amplifier 88 to provide common mode rejection and to limit the input so that the remote stations can be coupled anywhere along the transmission line 14. The output from the amplifier 88 is supplied to the dual level comparator 90 where it is compared with a reference voltage and used to generate bit signals in the form of positive and negative pulses and positive and negative levels.

The positive and negative pulses are fed to an input sequencer, which can take the form of a series of gates arranged to initially pass only a positive-going pulse indicating the 0 of the synchronizing code. When a positive pulse is received, window generator 104 is triggered to generate a first window pulse after a time period of less than one bit time having a width to span the center of the next bit time, and the synchronizer control 110 changes the gating to receive a negative pulse coinciding with the first window pulse. If a negative pulse is received before the window pulse is generated or no negative pulse is received during the window pulse, this wall be an error and reset will occur. If a negative pulse is received during the first window pulse, a second window pulse will be generated during which a second negative pulse must be received or reset will occur.

When the proper synchronizing code is received, as determined by the synchronization control 110, NAND gate 108 will be enabled and, the reset of the message allowed to pass to the data register. Each received pulse continues to cause the generation of the next successive window pulse, however, such that each bit signal must coincide with a window pulse or an error pulse will be generated causing reset of the receiver sequencer. By means of the self-generated window pulses, the received message is both synchronized and timed for decoding and self-clocking into the data register.

The first word of the double-word following the synchronizing code is stored in the data register 112, and the second word is compared with the positive and negative levels of the first word in order to verify the message. Both words must be the same or the receiver sequencer will reset. If the message received has no errors, the field point addressed will be enabled, and the required function will be carried out.

The transmitter sequencer circuitry of FIG. 5 is shown in greater detail in FIG. 8 wherein the shift register 66 is shown as receiving parallel input signals 68 from a programmed message forming circuit 120 which can have any conventional structure, such as a sequential counter, to provide data on inputs 68 corresponding to the synchronization code and the address and function portions of digital messages addressing consecutive field points such that the field points are automatically scanned. At the remote stations, the circuit 120 will be replaced with a circuit for forming a return message from addressed field points; however, the remaining structure of the remote and central transmitter sequencers is the same. The shift register 66 has a load input 122 received from synchronizer 70, a reset input 124, a clock input 126 and an output 128. A J-K flip-flop 130 has J and K inputs tied to a 1 input so that the flip-flop will toggle on each clock pulse supplied to its clock pulse input Cp. The $\overline{Q}$ output of the encoder 130 is connected to the clock input 126 of register 66 and as one input to each of NAND gates 132 and 134. The output 128 of the register 66 is directly connected to the other input of NAND gates 132 and 134. The output 128 of the register 66 is directly connected to the other input of NAND gate 132 and through an inverter 136 to the other of NAND gate 134. The outputs of NAND gates 132 and 134 are connected to the J and K inputs, respectively of an output J-K flip-flop 138, the $\overline{Q}$ output of which is fed through an inverter 140 to a data output terminal 142.

The counter 80 has a clock input 146 connected to the Q output of encoder flip-flop 130 and has an output 148 connected to the J. inputs of a first inhibit flip-flop 150 and a second inhibit flip-flop 152. The output 148 is also connected to an AND gate 154 and through an inverter 156 to an AND gate 158 and the K inputs of the inhibit flip-flops 150 and 152. A gated 2 MHz clock pulse is supplied from a source in the panel controls of the central and remote stations (not shown) to a terminal 160 and as inputs to AND gates 154 and 158. The output of AND gate 154 is connected to an OR gate 162, to the clock input Cp of encoder flip-flop 130 and to the clock input Cp of output flip-flop 138. The output of AND gate 158 is connected as an input to OR gate 162 and to an AND gate 164 which receives a second input from the $\overline{Q}$ output of first inhibit flip-flop 150. An OR gate 166 receives the outputs from OR gate 162 and AND gate 164, and the output of OR gate 162 is also connected to the clock input Cp of first inhibit flip-flop 150. The output of OR gate 166 is fed to the clock input Cp of second inhibit flip-flop 152. The Q output of first inhibit flip-flop 150 is supplied through an inverter 168 to a first inhibit terminal 170 and the Q output of second inhibit flip-flop 152 is supplied through an inverter 172 to a second inhibit terminal 174 and through an inverter 176 to a receiver inhibit terminal 178. This last mentioned inhibit output is used to inhibit the receiver sequencer of the associated station when a message is being transmitted.

Figure 9:
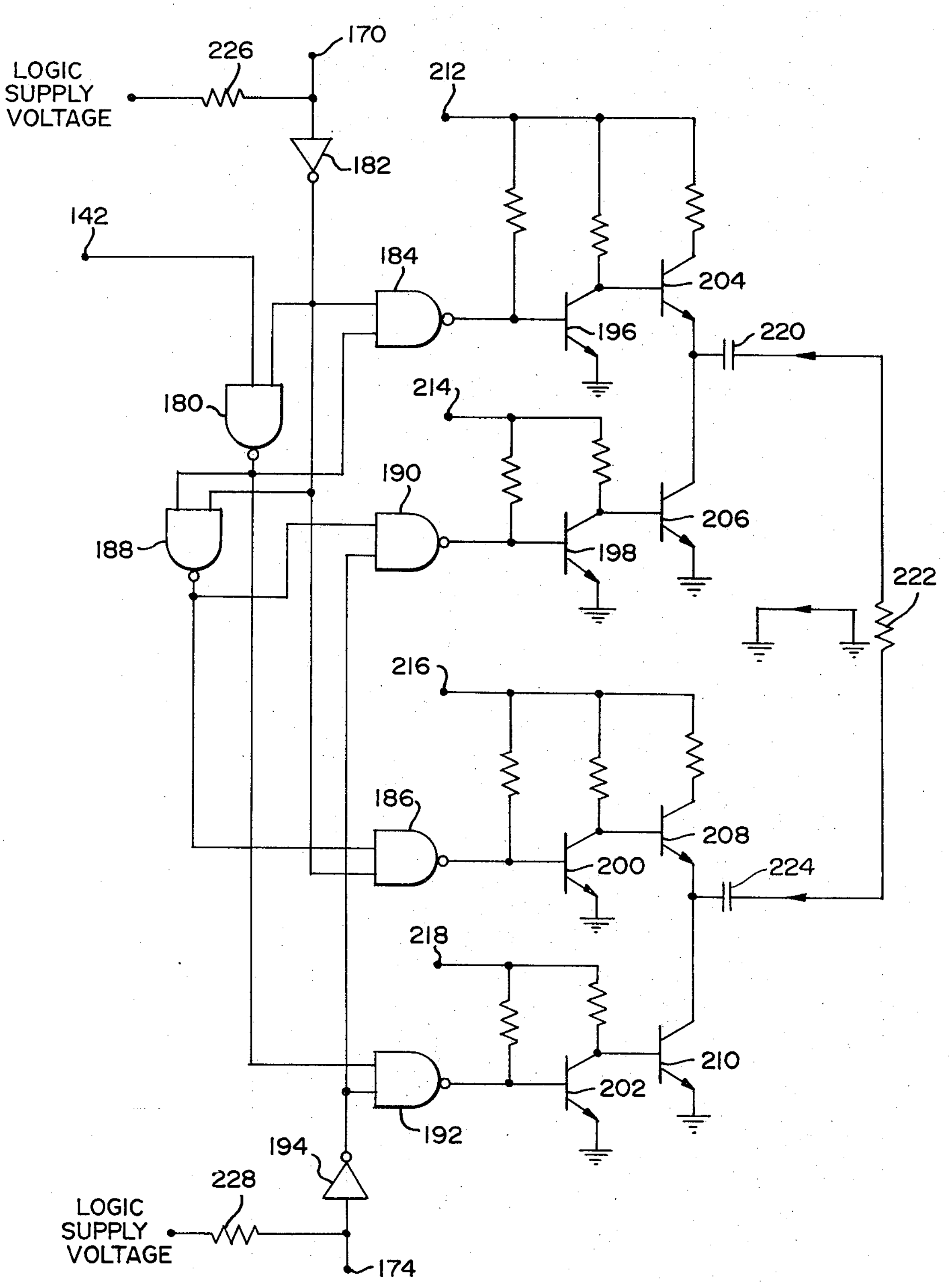
FIG. 9 is a schematic diagram of the line driver of of FIG. 5.

The line driver, as shown in FIG. 9, has a NAND gate 180 with one input received from data output terminal 142 and another input connected to first inhibit terminal 170 through an inverter 182. The output of inverter 182 is connected to one input of NAND gates 184 and 186, and the second input of NAND gate 184 is connected to the output of NAND gate 180 which is also connected to an input of a NAND gate 188. NAND gate 188 has another input connected to inverter 182, and the output of NAND gate is connected to NAND gates 186 and 190. Second inhibit terminal 174 is connected to NAND gates 190 and 192 through an inverter 194. The outputs of NAND gates 184, 186, 190 and 192 are connected to the bases of grounded emitter transistors 196, 200, 198 and 202, respectively, which have collectors connected to the bases of transistors 204, 206, 208 and 210 and to a drive voltage applied to terminals 212, 214, 216 and 218, respectively. The emitter of transistor 204 and the collector of transistor 206 are connected together and to a capacitor 220 and the transmission line 14, schematically represented by resistor 222. The emitter of transistor 208 and the collector of transistor 210 are similarly connected to the resister 222 through a capacitor 224. Logic supply voltage is fed to inverters 182 and 194 through resistors 226 and 228, respectively.

The operation of the transmitter sequencer will be described, with reference to FIG. 10, during the generation of the synchronization code having a 011 pattern, it being noted again that in the biphase Manchester code a positive transition near the center of a bit time designates a 0 and a negative transition a 1. The transmitter sequencer provides an output which, when connected to the line driver, will cause the voltage on the transmission line to change in a manner which follows the bit output from the shift register 66 through the use of the encoder and output flip-flops and the NAND gates 132 and 134 in the manner described below.

Initially a reset pulse is supplied to counter 80, shift register 66, encoder flip-flop 130, output flip-flop 138, first inhibit flip-flop 150 and second inhibit flip-flop 152 to clear the circuitry for generation of a new message. A load pulse from synchronizer 70 causes the desired message, including the synchronization code, to be loaded into register 66 from programmed message forming circuit 120. The output 128 of the register will thus be 0, which is the first bit of the synchronization code. The $\overline{Q}$ output of the encoder flip-flop 130 is 1 so that the input to NAND gate 132 is 01 and the input to NAND gate 134 is 11. Thus, there will be a 1 at the J input of output flip-flop 138 and a 0 at the K input. The output 148 from counter 80 will be 1 and is applied to the J inputs of inhibit flip-flops 150 and 152 and to inverter 156 where it is inverted and supplied to the K inputs of the inhibit flip-flops 150 and 152 as a 0. Thus, the Q outputs of both inhibit flip-flops will be 0 which is applied to NAND gates 184, 186, 190 and 192 of the line driver through inverters 168 and 172 and then inverters 182 and 194. These NAND gates will have a 1 output which turns on driver transistors 196, 198, 200 and 202 and holds line driver transistors 204, 206, 208 and 210 off.

The first clock pulse from the gated 2MHz clock pulse source will pass through AND gate 154 to the clock inputs of encoder flip-flop 130 and output flip-flop 138 and through OR gate 162 to the clock input of first inhibit flip-flop 150 and OR gate 166 to the clock input of second inhibit flip-flop 152 to cause flip-flops 130, 150 and 152 to change state and produce a 1 at their Q outputs, thereby removing the inhibit inputs from the line driver gates. The Q outputs of the encoder and output flip-flops also go to 1 after the clock pulse such that the $\overline{Q}$ output of the encoder flip-flop 130 is 0 provide a 1 at both the J and K inputs of output flip-flop 138 so that the output flip-flop will toggle on the next clock pulse.

The $\overline{Q}$ output from the output flip-flop 138 will be 0 at the input to NAND gate 180 causing a 1 input to NAND gates 184, 188 and 192 and a 0 output to transistors 196 and 202 rendering them nonconductive and allowing transistors 204 and 210 to conduct to place a negative voltage on the transmission line.

The second clock pulse causes the output flip-flop 138 to toggle since it has a 1 on both the J and K inputs. This causes a positive going transition in the center of the bit time, as required for a 0, by changing the output flip-flop $\overline{Q}$ output to provide a 1 at data output terminal 142 which causes the output of NAND gate 180 to be 0 and places a 0 at the inputs of gates 184 and 192 thereby causing their output to become 1 turning on transistors 196 and 202 while cutting off transistors 204 and 210. The 0 from NAND gate 180 will cause a 1 output from NAND gate 188 to the inputs of NAND gates 186 and 190 which will have 0 outputs to render transistors 198 and 200 nonconductive while allowing transistors 206 and 208 to conduct and drive the transmission line positive.

The state of encoder flip-flop 130 is changed by the second clock pulse to provide a $\bar{Q}$ output of 1 and causes the counter 80 to be clocked at half the rate of the encoder flip-flop and the register 66 to be shifted one bit. The counter changes on the rise of a clock pulse and the register on the fall of the clock pulse.

The Q output 128 of the register 66 is now 1 (the second bit of the synchronizing code) and both inputs to NAND gate 132 are 1 and the J input of the output flip-flop 138 is 0. Since one input to NAND gate 134 is 0, its output is 1 and the K input of output flip-flop 138 is 1.

Figure 10:
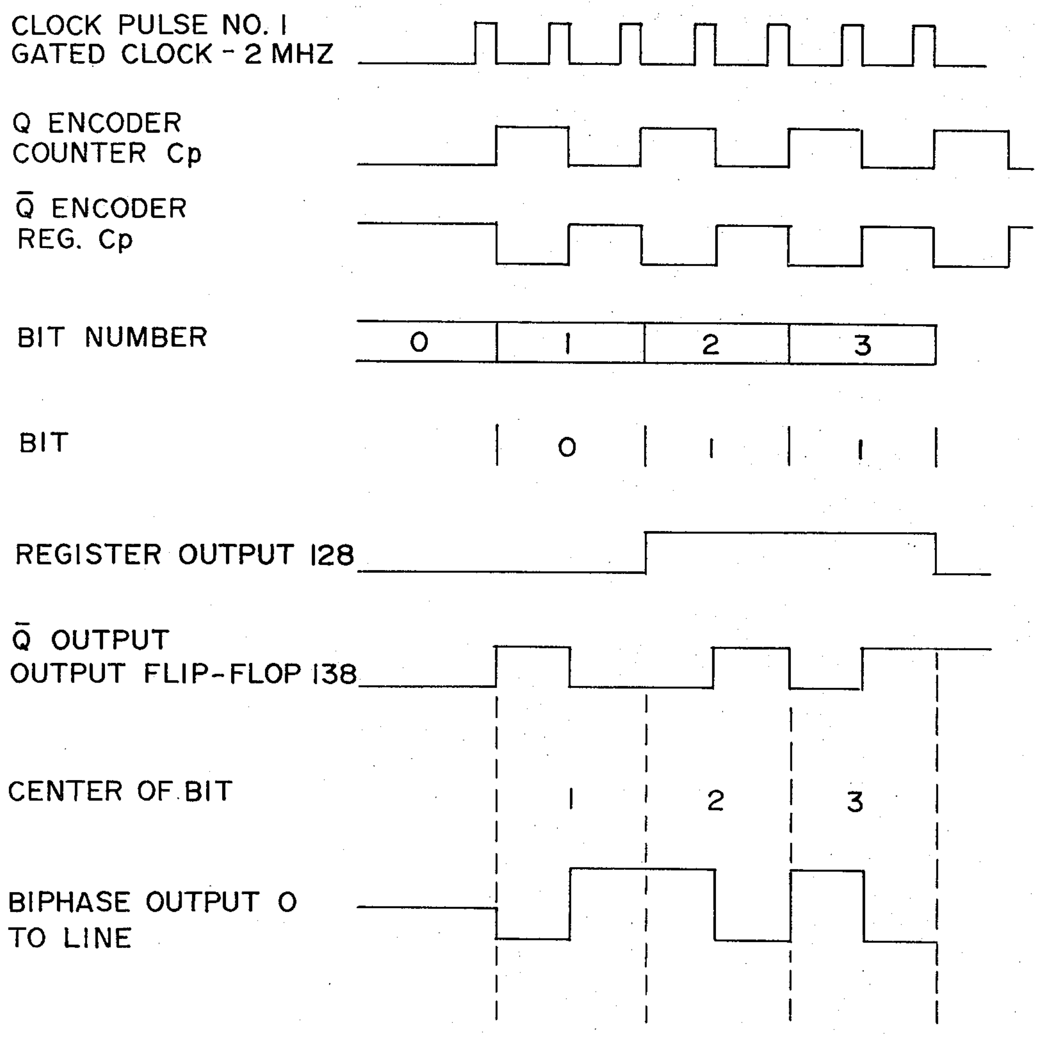
FIG. 10 is a timing chart illustrative of the operation of the transmitter sequencer and line driver.

The $\bar{Q}$ output of output flip-flop 138 is now 0, and the third clock pulse does not change this output, as shown in the timing diagram of FIG. 10. The encoder flip-flop 130 is toggled by the third clock pulse giving a 0 $\bar{Q}$ output resulting in a 1 at both the J and K inputs of output flip-flop 138.

The fourth clock pulse causes the output flip-flop 138 to again toggle and cause a negative going transition at the center of the bit time indicating a 1. This is accomplished by the $\bar{Q}$ output of output flip-flop 138 going to 0 which causes a 0 output from NAND gate 180 and a 1 output from NAND gate 184 and 192 which will render transistors 196 and 202 conductive and render transistors 204 and 210 nonconductive. The outputs of NAND gates 186 and 190 turn transistors 198 and 200 off and drive transistors 206 and 208 on. Under these conditions current flows from the source at terminal 216 through transistors 208 and 206 to ground to form the downwardly directed transistion of a 1 bit output. The next clock pulse causes a reversal of the on-off states of the transistors and thus produces a positive going transition.

The toggling of the encoder flip-flop 130 by the fourth clock pulse will cause the third bit of the synchronizing code, which is also 1, to be shifted to the output 128 of the register 66, and the $\bar{Q}$ output of the encoder flip-flop 130 is again 1. The J input of output flip-flop 138 will therefore be 0 and the K input 1.

The fifth clock pulse changes the $\bar{Q}$ of the output flip-flop 138 from 1 to 0 and produces a positive transition between the second and third bits in the same manner as described above with respect to the second clock pulse such that on the sixth clock pulse there is a negative transition in the center of the bit time to denote a 1.

Upon reaching a count equal to the bit length of the message, for example 35, the output 148 from the counter 80 goes to 0 causing the J inputs of inhibit flip-flops 150 and 152 to go to 0 while their K inputs, from inverter 156, go to 1. The 0 on AND gate 154 will prevent further clock pulses from reaching the encoder flip-flop 130 and register 66. The next clock pulse will cause first inhibit flip-flop 150 to change state placing a 0 on the Q output and a 1 at the $\bar{Q}$ output which enable AND gate 164 and OR gate 166 so that the following clock will cause second inhibit flip-flop 152 to change state and have a 0 on its Q output. The 0 Q output of the first inhibit flip-flop 150 causes a 0 at the input of NAND gates 180, 184, 186 and 188 and the outputs of these gates become 1. The Q output of the second inhibit flip-flop 152 is still a 1 after the 36 th clock pulse but prior to the 37th clock pulse so that the input to NAND gates 190 and 192 is 1. Since both the inputs to gates 190 and 192 are 1 their outputs will be 0 thus allowing transistors 206 and 210 to conduct. This connects both line drive capacitors 220 and 224 to ground causing them to discharge. At the same time, since one input to NAND gates 184 and 186 is 0, these outputs are 1 to allow transistors 196 and 200 to conduct and cut off transistors 204 and 208 thereby disconnecting the capacitors 220 and 224 from the voltage at terminals 212 and 216.

On the second clock pulse after the end of the message, the 37th clock pulse, the 0 Q output of the second inhibit flip-flop 152 places a 0 on the inputs to NAND gates 190 and 192. The outputs of these gates are thus 1 to turn on transistors 198 and 202 and cut off transistors 206 and 210. Thus, at this point in time, all of the line drive transistors 204, 206, 208 and 210 are disconnected from the transmission line.

Figure 11:
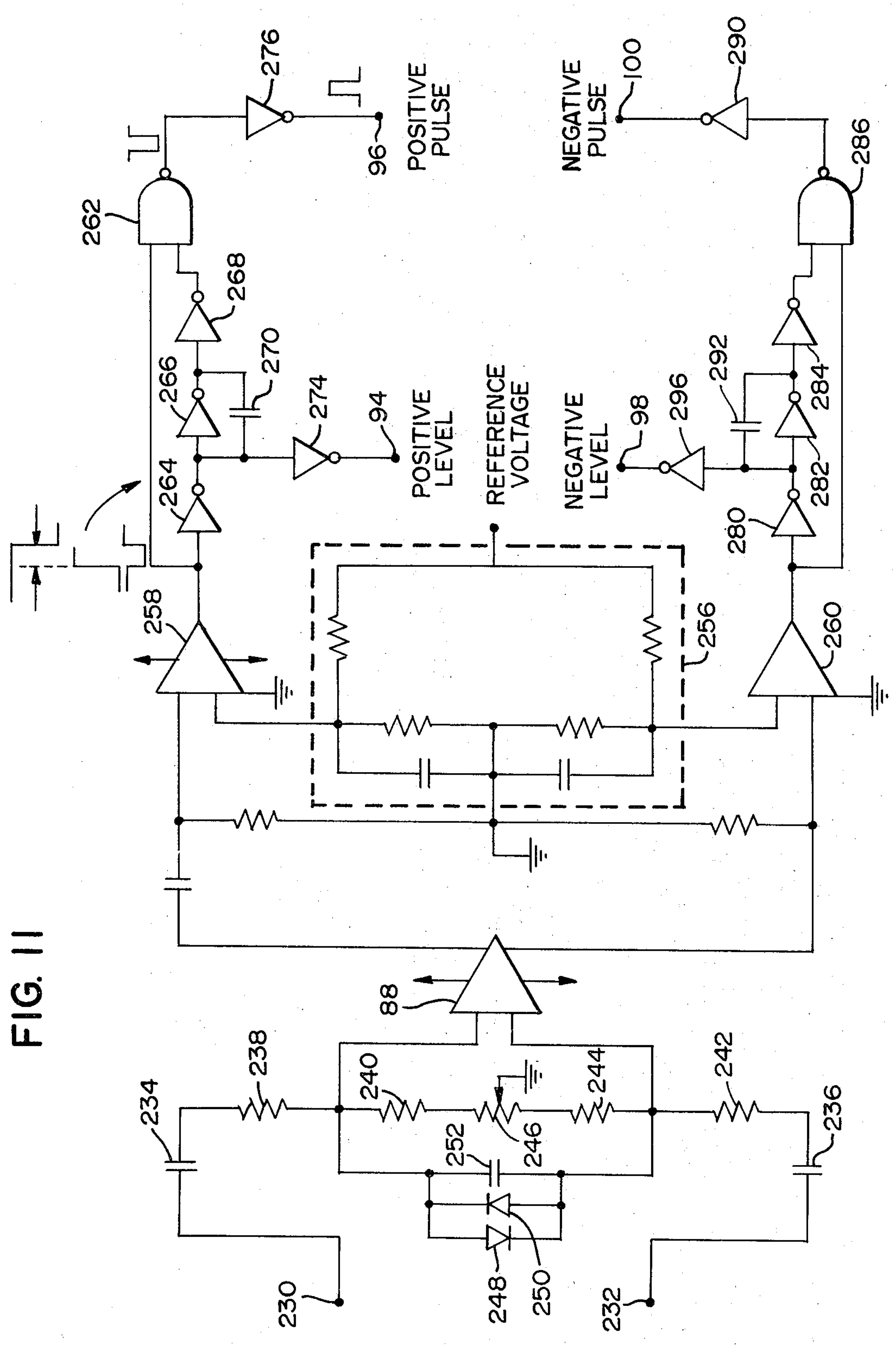
FIG. 11 is a schematic diagram of the line receiver of FIG. 6.

The line receiver of FIG. 6 is shown in greater detail in FIG. 11, and has terminals 230 and 232 for connection with the transmission line 14. connected across these terminals is a circuit including capacitors 234 and 236, each having high reactance at low frequency; and resistors 238, 240, 242 and 244 and a potentiometer 246 are serially connected between the capacitors 234 and 236, resistors 238 and 242 each having a resistance much higher than the impedance of the transmission line to permit any receivers to be connected across the transmission line. The resistive-capacitive circuit provides high attenuation at 60 Hz while the potentiometer 246 provides adjustment for common mode rejection of noise by differential amplifier 88. A limiting circuit, including diodes 248 and 250 connected in inverse parallel and a capacitor 252 connected in parallel with the diodes, is connected across resistors 240 and 244 and potentiometer 246. The diodes serve to limit the input to amplifier 88 and, thus, allow the receiver to be connected anywhere along the transmission line and yet not to be overpowered by a signal generated near the transmitter. The capacitor 252 provides high frequency cutoff. Amplifier 88 is a high speed differential operational amplifier and is connected across resistors 240 and 244 and potentiometer 246 and thus, across the limiting circuit. The amplifier has positive and negative outputs which are compared to a reference voltage from a supply circuit 256 by comparators 258 and 260, respectively.

The output of the positive comparator 258 is supplied to one input of a NAND gate 262 of a pulse forming circuit and through a delay line formed by series connected inverters 264, 266 and 268 to the other input of NAND gate 262. The direct connection to NAND gate 262 forms the leading edge and the delay line forms the trailing edge of a pulse output from NAND gate 262. A capacitor 270 is connected across inverter 266 to further delay the trailing edge, and a positive level output at terminal 94 is taken from between inverters 264 and 266 and through an inverter 274. The pulse output from NAND gate 262 is passed through an inverter 276 to positive pulse output terminal 96.

A similar arrangement is connected to the output of the negative comparator 260 and includes inverters 280, 282 and 284 forming a delay line to a NAND gate 286. The negative pulse output terminal 100 is connected to the output of NAND gate 286 through an inverter 290, and a capacitor 292 is connected across inverter 282 and such that the negative level output at terminal 98 is taken from between inverter 280 and 282 and through inverter 296.

As discussed with respect to FIG. 6, the function of the line receiver is to take signals from the transmission line 14 and convert them to bit signals formed of a series of positive and negative level and pulse outputs. The line receiver also discriminates against low amplitude noise since the comparators 258 and 260 require that the signals exceed a certain fixed value before an output is obtained. The function of the RC network at the input is to provide high rejection of 60 Hz noise to the input of the amplifier 88 while capacitor 252 attenuates high frequencies. Common mode rejection by the input circuit effectively reduces common mode noise to a point where signals can be satisfactorily received. Diodes 28 and 30 are connected across the amplifier input to protect the circuit from unintentional overvoltage or high noise peaks.

Figure 12A:
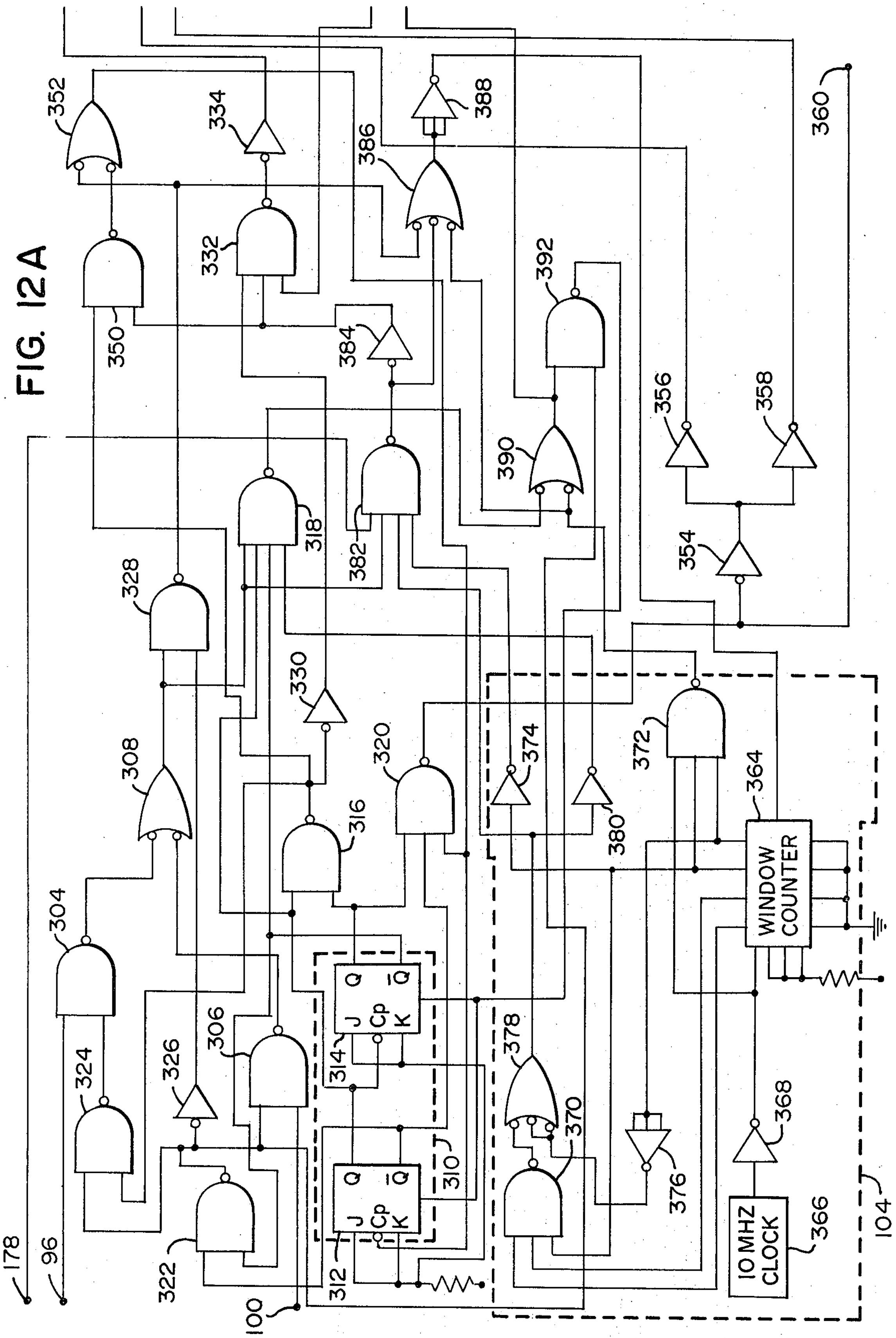
FIGS. 12A and 12B are schematic diagrams of the receiver sequencer of FIG. 7.

The receiver sequencer of FIG. 7, as utilized in the central control station and the remote stations, is shown in greater detail in FIGS. 12A nd 12B and receives positive input pulses at terminal 96, negative input pulses at terminal 100 and a receiver inhibit signal at a terminal 178 from the transmitter sequence, as shown in FIG. 8, to cut off the receiver sequencer any time a message is being transmitted from the same station. The positive pulse terminal 96 is connected to an input of a NAND gate 304 and the negative pulse terminal 100 is connected to an input of a NAND gate 306 with the outputs of NAND gates 304 and 306 being connected to the inputs of a NAND gate 308. A synchronizer counter 310 is formed by a pair of J-K flip-flops 312 and 314 which have their J and K inputs coupled to a 1 input so as to toggle on each clock pulse. The Q output of flip-flop 312 is connected as the clock pulse input of flip-flop 314 and as an input to a 3-count NAND gate 316 and an input to a 0–7 count reset NAND gate 318. The $\overline{Q}$ output of flip-flop 312 is connected to an input of a data-counter reset NAND gate 320 and an input to a 0-count NAND gate 322. The output of NAND gate 322 is connected as an input to NAND gate 306, a NAND gate 324 and an inverter 326. The output of NAND gate 324 is connected to the second input of NAND gate 304 while the output of the inverter 326 is connected to an input of a first pulse reset NAND gate 328. The output of 3-count NAND gate 316 is connected as the second input to NAND gate 324. The Q output of flip-flop 314 is connected to inputs of NAND gates 316 and 320 while the $\overline{Q}$ output is connected to inputs of NAND gates 318 and 322.

The output of 3-count NAND gate 316 is connected through an inverter 330, a data count NAND gate 332 and an inverter 334 to data counter 116 which is formed of six J-K flip-flops 338, 340, 342, 344, 346 and 348, each having its J an K inputs connected to a 1 input and its Q output connected to the clock pulse input of the next successive flip-flop. The output of 3-count NAND gate 316 is also supplied through a NAND gate 350 to a NAND gate 352.

The output from data counter reset NAND gate 320 is supplied through an inverter 354 to inverters 356 and 358 connected to data counter J-K flip-flops 338, 340, 342 and 344, 346, 348 respectively, and the output of data counter reset NAND gate 320 is also connected to a reset terminal 360 which is used to reset circuitry (not shown) normally associated with a receiver of this type.

The window generator 104 includes a window counter 364 receiving a 10 MHz clock pulse from a source 366 through an inverter 368 and supplying first, second and third outputs to inputs of a NAND gate 370 with the third output also being supplied to inputs of a NAND gate 372 and an inverter 374. The stages of the window counter 364 are connected to a 1 input and to ground while a fourth output of the window counter is connected to an input of NAND gate 372 and through an inverter 376 to an input of a NAND gate 378. The NAND gate 378 is connected to receive the output of NAND gate 370 and has its output connected to reset NAND gate 318 through an inverter 380 and connected to a correct pulse reset NAND gate 382. The output of NAND gate 382 is connected through an inverter 384 to an input of data count NAND gate 332 and the second input of NAND gate 350 and directly connected to a NAND gate 386 which feeds its output through an inverter 388 back to windown counter 364.

Clock pulses from source 366 are supplied through inverter 368 to an input of NAND gate 372 which has its output connected as one input to NAND gate 386 and a NAND gate 390 which also receives the output of reset NAND gate 318. The output of NAND gate 390 is connected to an input of a NAND gate 392 which also receives an input from 0-count NAND gate 322. The output of NAND gate 392 is supplied to the reset inputs of the synchronizer counter flip-flops 312 and 314.

The output of NAND gate 308 is connected to inputs of first pulse reset NAND gate 328, reset NAND gate 318 and correct pulse reset NAND gate 382. The receiver inhibit signal from terminal 178 is supplied to an input of correct pulse reset NAND gate 382 as is the third output of the window counter 364 through inverter 374. The output of first pulse reset gate 328 is connected an an input to NAND gates 352 and 386, and the output of NAND gate 352 is connected to an input of data counter reset NAND gate 320 and to the clock pulse input of flip-flop 312.

The data register 112 is formed of a series of registers 396, 398, 400 and 402, each of which includes four storage flip-flops connected to receive an input from data count gate 332 through inverters 334 and 404. The data register 112 is timed to 1 inputs and is provided with the usual outputs. The positive level terminal 94 from the line receiver is connected to an input of a NAND gate 408 and to an input of data register 112 while the negative level terminal 98 from the line receiver is connected to an input of a NAND gate 412. Gates 408 and 412 also receive inputs from outputs of data register 112, and the outputs of NAND gates 408 and 412 are connected as inputs to a NAND gate 414 which supplies its output to a NAND gate 416. NAND gate 416 also receives inputs from the Q output of flip-flop 346 of data counter 116 and from data count gate 332 through inverter 334. The output of NAND gate 416 is connected to an error flip-flop 418 including cross coupled NAND gates 420 and 422. The $\bar{Q}$ output of data counter flip-flop 348 is connected to inputs of NAND gate 424 and data count NAND gate 332. The output of NAND gate 390 is connected as the other input of NAND gate 424. The output of NAND gate 424 is connected as an input to NAND gate 420 of flip-flop 418. The $\bar{Q}$ output of data counter flip-flop 346 is connected to an input of NAND gate 426 as is the output of data count NAND gate 332 through inverter 334. The $\bar{Q}$ output of flip-flop 346 is also supplied to terminal 430 to signal the end of the first 16-bit word. The output of NAND gate 426 is supplied to an input of NAND gate 422 of error flip-flop 418, and the error output from error flip-flop 418 is taken froma terminal 428.

In operation, messages are taken from the transmission line 14 by the line receiver, and positive and negative pulses and levels are produced at terminals 94, 96, 98 and 100 in accordance with the message bits, as illustrated in FIG. 1. As described briefly with reference to FIG. 7, a received message is initially checked for the synchronization code 011 prior to supply of the double-word body to the data register 112 and the data counter 116. To this end, the receiver sequencer reacts to the first positive pulse produced at terminal 96 to trigger the sync counter 310 through NAND gates 304, 308, 328 and 352 to advance one count and inhibit NAND gate 304 through NAND gates 322 and 324, inhibit first pulse reset NAND gate 328 through NAND gate 322 and inverter 326 and enable NAND gate 306 through NAND gate 322. Thus, only a first pulse can be passed by first pulse reset NAND gate 328 to trigger the sync counter 310, and the gating is conditioned for a 1 bit or negative pulse after the first positive pulse corresponding to a 0 bit. The first positive pulse also resets the window counter 364 through NAND gates 304, 308, 328 and 386 and inverter 388 such that the window counter 364 commences counting clock pulses.

If the second pulse is negative, representative of a 1 bit, the pulse will be supplied at terminal 100 and will be passed through NAND gates 306 and 308 to NAND gates 318 and 382 which are controlled in response to window counter 364 such that 0–7 count reset NAND gate 318 is enabled through NAND gates 370 and 378 and inverter 380 as the window counter counts from zero to seven clock pulses while correct pulse reset NAND gate 382 is inhibited during this time. When the window counter 364 is between the counts of seven and twelve, a window pulse is generated through NAND gates 370 and 378 to inhibit 0–7 count reset NAND gate 318 and enable correct pulse reset NAND gate 382 such that when the negative pulse coincides with the window pulse, which is timed to span the center of the next bit time, NAND gate 382 will supply a pulse through NAND gate 386 and inverter 388 to reset the window counter 364 and through inverter 384 and NAND gates 350 and 352 to trigger sync counter 310. Data count NAND gate 332 is inhibited at this time to prevent the pulse from NAND gate 382 from being supplied to data register 112 and data counter 116.

If the second pulse is positive, it will not be passed by NAND gate 304, and the receiver sequencer will be reset if no further negative pulse is timely received prior to the end of the window pulse terminated by the window counter 364 counting to 12 to enable NAND gate 372 and reset sync counter 310 through NAND gates 390 and 392. Thus, if no proper bit pulse is received within the window, the sync counter 310 will be reset to await the next positive pulse to again commence checking for the synchronization code. If the second pulse is negative and arrives before the window pulse is generated, the 0–7 count reset NAND gate 318 will provide an output through NAND gates 390 and 392 to reset the sync counter 310.

Once a properly timed, negative second pulse is received, the sync counter 310 will have a count of 2 to again condition NAND gate 306 to receive a negative third pulse representative of the 1 third synchronization bit. As can be seen from the timing diagram of FIG. 1, between the 0 and the first 1 of the synchronization code there is no transition; however, between the first 1 and the second 1 of the synchronization code there is a transition at the start of the bit. Such a positive going transition would normally indicate an 0 which, if passed, would give an erroneous input. The window pulse is so timed, however, that no pulse signal representing a bit transition will be passed except for those pulses appearing near the center of each bit time. If the negative going transition of the second 1 is correctly received, the data counter NAND gate 332 will be enabled by 3count NAND gate 316, the synchronization count NAND gate 350 will be inhibited and further pulses will be passed to the data register 112 and the data counter 116. In this manner, the entire message is checked for timing, with each successive bit generating a window pulse timed to span the center of the next successive bit time, and the synchronizing code is decoded.

After the receipt of the third synchronizing bit (the second 1) NAND gate 350 will be inhibited to prevent further supply of pulses to the clockpulse inputs of sync counter 310, and the data counter 116 will be reset via data counter reset NAND gate 320 at the third synchronizing pulse. The first data pulse received after the synchronization code is passed to the clock pulse input of data counter 116 and to the clock pulse input of data register 112. Positive levels are clocked into the data register 112 by the data pulses from NAND gate 332 causing the data to shift in the register one position for each count until a count of 16, representing the first 16-bit word, is reached at which time NAND gate 416 is enabled. Positive and negative levels are passed to NAND gate 408 and 412 from input terminals 94 and 98, respectively, and are compared with outputs from the register 112. The second 16-bit word received must be identical with the first 16-bit word; and, as the second word is received, a comparison is made between the input levels of the second word and the corresponding output levels from the register to see that they are the same. Should any bit of the second word be different from the corresponding bit of the first word, an error pulse is passed through NAND gate 416 to set the error flip-flop 418 and generate an output to inhibit the field points and the transmitter and prevent any response to the eroneous message.

Thus, the messages are received in a manner to utilize the bit signals obtained from the bits of the messages to screen out noise and transitions at the beginning of a bit time and for self-clocking into the data processing circuitry at the central and remote stations. To this end, when the messages are being transmitted at a rate of one million bits per second and when the window generator clock source 366 has a rate of 10MHz, 10 clock pulses from clock source 366 represent one bit time; and, accordingly, by causing the window counter 364 to count clock pulses in response to a pulse signal representative of a bit transition and by generating the window pulses when the window counter 364 is between the counts of seven and twelve, the leading edges of the window pulses will be generated after a time period of one-half bit time and, thus, after the beginning of the next bit time but before the center thereof, and the trailing edges of the window pulses will be generated after the center of the next bit time but before the beginning of the bit time following the next bit time. The window pulses will, therefore, be generated after a time period of less than one bit time but greater than one-half bit time and will have a width span the center of the next bit time such that only a pulse signal received during the window pulse will be passed by NAND gate 382.

The positive and negative pulse signals produced by the line receiver in response to level changes (transitions) in the received messages are, accordingly, timed with preceding pulse signals by the window pulses and cause data pulses to be supplied by NAND gate 332 to the data register 112 and the data counter 116 such that the level signals produced by the line receiver are shifted into the data register 112 and the data counter 116 counts the number of bits received in the doubleword body of received messages. Thus, the bits of the messages are self-clocked into the data register obviating the need at the receivers for a clock source synced with the transmitters and requiring only the use of an inexpensive clock source for the window generator since error therein will not be accumulated.

From the above, it will be appreciated that the supervisory control system of the present invention can be utilized to operate a large number of field points of varying nature, such as analog, status and control points, in a short time by scanning the field points from the central control station to detect alarm and offnormal conditions quickly. The messages from the central control station and the answer messages returned from the remote station are transmitted in a biphase code having bit transitions near the center of each bit time and, by utilizing a counter to provide self-timing window pulses in response to each bit signal, an inexpensive clock source can be utilized at each station without error accumulation in that the window counter is reset after the receipt of each bit signal.

The central control station, as mentioned above, preferably contains a graphic display and/or printer for readout of point data, a keyboard for addressing a point or for control, a memory which contains necessary information on each point, an intercom an alarm, as well as the logic for controlling the system. The display may be of any well known type such as the Burroughs 16 character self scan panel display. The keyboard, for addressing any point in the system, includes switching means for initiating control action of a remote point, selecting the desired printer format and graphic display, programming the memory and controlling the intercom. The core memory should have a basic system of about 1800 points. Information related to each point is stored in the memory and called up when each point is addressed. The memory capacity may be increased in steps of about 2000 points to a maximum of approximately 15,800 points with subsystems.

Each point is identified by a unit (maximum 8), a unit number (maximum 32) and a point number (maximum 99). Information concerning each point is stored in the memory by unit and unit number. The point number is identified by counting the number of points from zero memory address to the point desired. This is the memory address of the point and is also the address of the point in the remote panel. Therefore, the unit and number may be random but the point number is sequential from the lowest memory address to the highest.

The supervisory control system is preferably arranged to report all alarms which are not inhibited. For example, analog alarms are provided with independently settable high and low alarm limits on a channel basis. An analog-to-digital converter output is compared to the limits each time the point is addressed with an alarm being indicated should these limits be exceeded. Status alarms indicate when normally open contacts are open or closed and vice versa. Some alarms are initially inhibited to allow start or stop conditions to stabilize before giving an alarm.

Figure 12B:
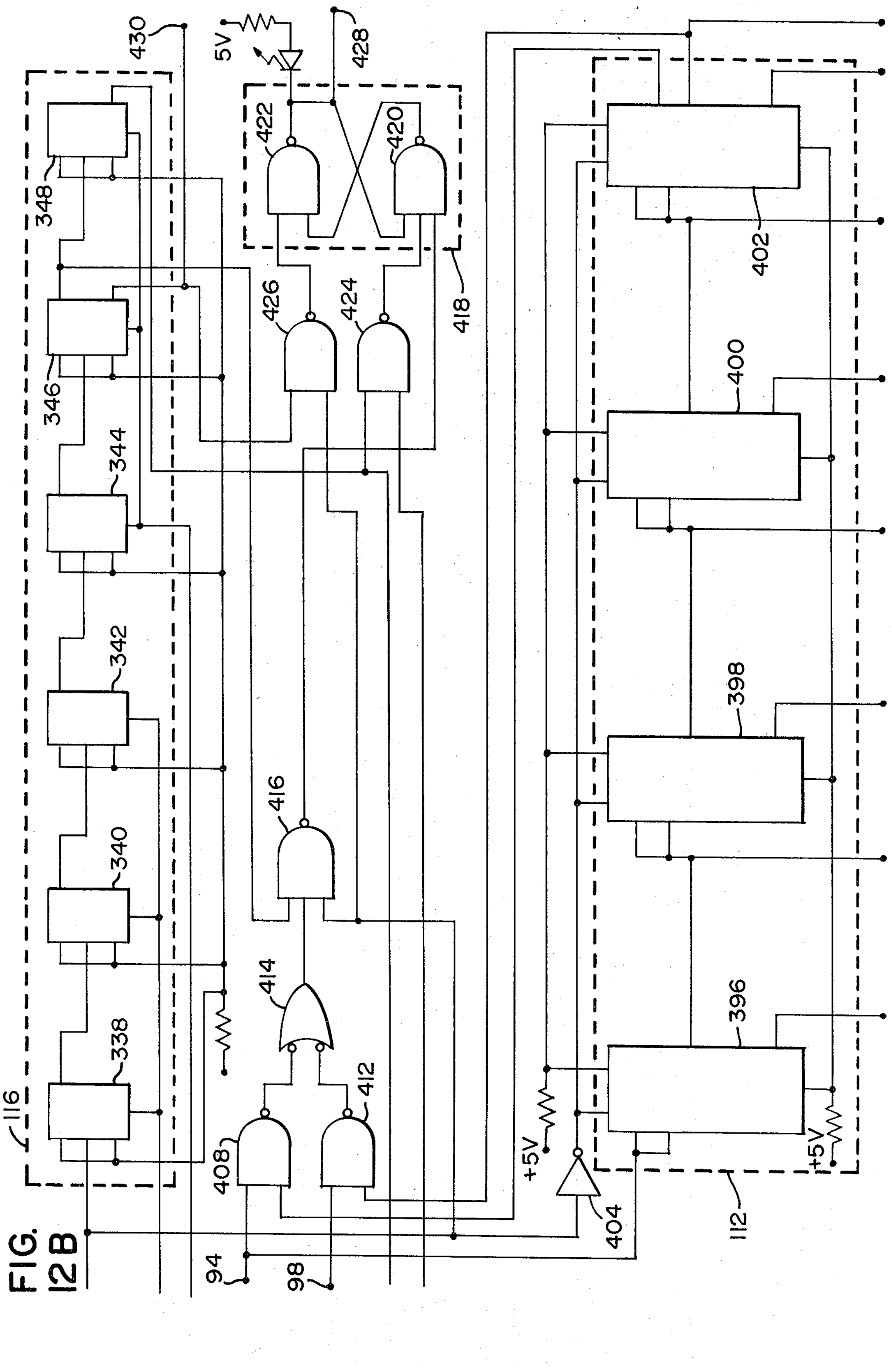

The supervisory control system of the present invention has been described above and shown in the drawings in a manner to facilitate understanding thereof. To this end, FIGS. 5, 6 and 7 have been simplified in order to illustrate the basic operation of the transmitter and receiver sequencers; and, in practice some of the circuits illustrated in these figures would be part of different blocks in the block diagrams of FIGS. 3 and 4. Similarly, the logic symbols utilized in the drawings have been chosen to facilitate understanding of the operation of the supervisory control system on a high or 1 level basis; however, any suitable logic could be utilized to implement the present invention utilizing various circuitry and descriptive terminology. For instance, gates 308, 353, 378, 386, 390 and 414 of FIGS. 12A and 12B are described above as high level NAND gates but could also be considered from a functional standpoint as low level NOR gates.

Inasmuch as the present invention is subject to many variations, modifications, and changes in detail, it is intended that all matter described above or shown in the accompanying drawings be interpreted as illustrative and not in a limiting sense.

What is claimed is:

1. A supervisory control system for operating a plurality of field points comprising a central control station including transmittter means for transmitting messages each formed of bits corresponding to an address of one of said field points, said messages being transmitted in a biphase code with each bit having a bit time with a transition near the center thereof, and said transmitter means including scanning means for forming messages to automatically sequentially address said field points;

a plurality of remote stations each including receiver means for receiving said messages, a group of said field points and decoder means connected with said receiver means for addressing said field points, said receiver means including means for generating bit signals in accordance with bit transitions of said messages, window generator means responsive to each bit signal to generate a window pulse after a predetermined time less than one bit time, each window pulse having a width to span the center of the next bit time, and gating means receiving said window pulses and said bit signals and passing said bit signals to said decoder means only when said bit signals coincide with said window pulses; and transmission means for coupling said central control station with said remote stations.

2. A supervisory control system as recited in claim 1 wherein said transmission means is a shielded, twisted pair of wires coupled with said transmitter means and said receiver means to provide differential transmission and common mode rejection of noise.

3. A supervisory control system as recited in claim 2 wherein said transmitter means includes line driver means, capacitance means coupling said line driver means to said pair of wires and encoder and inhibit means for supplying said messages to said line driver means for transmission via said pair of wires and for inhibiting said line driver means to discharge said capacitance means and effectively disconnect said line driver means from said pair of wires.

4. A supervisory control system as recited in claim 1 wherein each of said remote stations includes transmitter means for transmitting answer messages from field points addressed by said messages from said central control station, said address messages from said remote station transmitter means being transmitted in a biphase code with each bit having a bit time with a transition near the center thereof, and said central control station includes receiver means for receiving said answer messages from said remote stations and for generating bit signals in accordance with bit transitions thereof, window generator means responsive to each bit signal to generate a window pulse after a predetermined time less than one bit time, each window pulse having a width to span the center of the next bit time, and gating means receiving said window pulses and said bit signals and passing said bit signals only when said bit signals coincide with said window pulses.

5. A supervisory control system as recited in claim 4 wherein said transmitter means at each of said stations provides an inhibit signal when a message is being transmitted, said inhibit signal being supplied to said receiver means at said station to inhibit operation thereof.

6. A supervisory control system as recited in claim 4 wherein each of said messages includes a synchronizing code followed by a message body and said receiver means at each of said stations includes code comparison means responsive to said synchronizing code to pass said message body.

7. A supervisory control system as recited in claim 6 wherein said code comparison means includes a synchronization counter for counting said bit signals and sequence gating means responsive to the output of said synchronization counter to sequentially receive bits only corresponding to said synchronizing code.

8. A supervisory control system as recited in claim 7 wherein said synchronizing code has a first bit of a first predetermined state and a second bit of a second predetermined state and said code comparison means is responsive to a received bit of said first predetermined state to trigger said synchronization counter, and said sequence gating means is responsive to triggering of said synchronization counter to be conditioned to receive a next bit of said second predetermined state.

9. A supervisory control system as recited in claim 8 wherein said gating means receiving said window pulses and said bit signals provides a pulse to reset said synchronization counter if no bit signal is received during a window pulse.

10. A supervisory control system as recited in claim 9 wherein said window generator means includes window counter means, clock pulse means for supplying clock pulses to said window counter means, means for supplying said bit signals to said window counter means to cause said window counting means to count said clock pulses, means responsive to said window counter means for supplying a window pulse to said gating means when said window counter means is between first and second predetermined counts, and means responsive to said gating means to supply a pulse to reset said window counter means when a bit signal coincides with a window pulse.

11. A supervisory control system as recited in claim 6 wherein said message body is formed of first and second identical words and said receiver means at each of said stations includes a data register for storing said first word after said synchronizing code is received and comparison gating means for receiving said second word bit by bit and comparing said second word with said first word from said data register bit by bit.

12. A supervisory control system as recited in claim 4 wherein said field points at said remote stations include analog and status points, and said transmitter means at said remote stations includes means for forming bits in said answer messages corresponding to an analog value at said analog points and a condition at said status points.

13. A supervisory control system as recited in claim 1 wherein said window generator means includes window counter means, clock pulse means for supplying clock pulses to said window counter means, means responsive to said bit signals to cause said window counter means to count said clock pulses, means responsive to said window counter means for supplying a window pulse to said gating means when said window counter means is between first and second predetermined counts, and means responsive to said gating means to supply a pulse to reset said window counter means when a bit signal coincides with a window pulse.

14. A supervisory control system comprising a central control station;

a plurality of remote stations; and transmission line means connecting said central control station with said remote stations, said central control station and said remote stations each including transmitter means for transmitting messages via said transmission line means in a biphase code with each bit having a bit time with a transition near the center thereof, and said central control station and said remote stations each including receiver means for receiving messages from said transmitter means via said transmission line means, said receiver means including means for generating bit signals in accordance with bit transitions of said transmitted messages, window counter means, clock pulse means for supplying clock pulses to said window counter means, means responsive to said bit signals to cause said window counting means to count said clock pulses, means responsive to said window counter means for providing window pulses when said window counter means is between first and second predetermined counts, said first predetermined count being reached after a period of time less than one bit time and said second predetermined count being reached after a period of time greater than one bit time such that each of said window pulses spans the center of a next successive bit time, and gating means receiving said window pulses and said bit signals to pass said bit signals only when said bit signals coincide with said window pulses.

15. A supervisory control system as recited in claim 14 wherein said receiver means includes means responsive to said gating means to reset said window counter means when a bit signal is received in coincidence with a window pulse.

16. A supervisory control system as recited in claim 15 wherein said transmission line means includes a shielded, twisted pair of wires and said transmitter means includes a line driver capacitively coupled with said pair of wires and encoder and inhibit means for operating said line driver to effectively disconnect said line driver from said pair of wires when no messages are being transmitted.

17. A supervisory control system comprising a central control station;

a plurality of remote stations; and transmission line means connecting said central control station with said remote stations, said central control station and said remote stations each including transmitter means for transmitting messages via said transmission line means in a biphase code with each bit having a bit time with a transition between first and second levels near the center thereof, and said central control station and said remote stations each including receiver means for receiving messages from said transmitter means via said transmission line means, said receiver means including means for generating pulse signals in accordance with transitions of each bit of said transmitted messages and level signals in accordance with said first and second levels of each bit of said transmitted messages, data means, means for supplying said level signals to said data means, and timing means responsive to said pulse signals to supply data pulses to said data means to control passing of said level signals into said data means whereby the bits of said transmitted messages are self-clocked into said data means.

18. A supervisory control system as recited in claim 17 wherein said timing means includes window generator means responsive to each pulse signal to generate a window pulse after a predetermined period of time less than one bit time but greater than one-half bit time, each window pulse having a width to span the center of the next bit time, and gating means receiving said window pulses and said pulse signals to supply said data pulses to said data means only when said pulse signals coincide with said window pulses.

19. A supervisory control system as recited in claim 18 wherein said messages each include first and and identical words, said data means includes a data register for storing said level signals corresponding to said first word and comparison means receiving said level signals corresponding to said second word, said level signals from said data register corresponding to said first word and said data pulses to compare said first and second words bit by bit in timed relation with said data pulses.

20. A supervisory control system as recited in claim 19 wherein each of said first and second words is formed of a predetermined number of bits and said data means includes a data counter counting said data pulses and having an output for enabling said comparison means when said predetermined number of data pulses have been counted.

21. A supervisory control system as recited in claim 17 wherein said transmission line means is a shielded twisted pair of wires, and each of said receiver means includes high impedance, high pass filter means coupled with said pair of wires whereby a large number of central and remote stations can be connected via said pair of wires without substantially degrading the messages.

22. A supervisory control system as recited in claim 21 wherein each of said transmitter means includes line driver means for selectively connecting and disconnecting said transmitter means with said pair of wires.

23. A supervisory control system as recited in claim 22 wherein each of said transmitter means includes capacitance means coupling said line driver means to said pair of wires and encoder and inhibit means for supplying said messages to said line driver means for transmission via siad pair of wires and for inhibiting said line driver means to discharge said capacitance means and effectively disconnect said line driver means from said pair of wires.

* * * * *